US010163315B2

United States Patent
Staszel

(10) Patent No.: US 10,163,315 B2
(45) Date of Patent: Dec. 25, 2018

(54) LOCALIZED HAZARD ALERT SYSTEM AND METHOD OF USE

(71) Applicant: Intelligent Dynamics LLC, Dearborn, MI (US)

(72) Inventor: Michael A. Staszel, Dearborn, MI (US)

(73) Assignee: Intelligent Dynamics LLC, Dearborn, MI (US)

( * ) Notice: Subject to any disclaimer, the term of this patent is extended or adjusted under 35 U.S.C. 154(b) by 0 days.

(21) Appl. No.: 15/569,237

(22) PCT Filed: May 16, 2016

(86) PCT No.: PCT/US2016/032697
§ 371 (c)(1),
(2) Date: Oct. 25, 2017

(87) PCT Pub. No.: WO2016/187116
PCT Pub. Date: Nov. 24, 2016

(65) Prior Publication Data
US 2018/0322755 A1    Nov. 8, 2018

Related U.S. Application Data

(60) Provisional application No. 62/179,789, filed on May 18, 2015.

(51) Int. Cl.
G08B 21/02     (2006.01)
G08B 27/00     (2006.01)
H04W 4/021     (2018.01)

(52) U.S. Cl.
CPC ...... *G08B 21/0227* (2013.01); *G08B 21/0261* (2013.01); *G08B 21/0275* (2013.01); *G08B 27/00* (2013.01); *H04W 4/021* (2013.01)

(58) Field of Classification Search
CPC ............ G08B 21/0227; G08B 21/0261; G08B 21/0275; G08B 27/00; H04W 4/021
See application file for complete search history.

(56) References Cited

U.S. PATENT DOCUMENTS

| | | | |
|---|---|---|---|
| 6,272,433 B2 | 8/2001 | Baron et al. | |
| 8,190,466 B2 | 5/2012 | Quandel et al. | |
| 2007/0008104 A1 | 1/2007 | McBain | |
| 2007/0149167 A1 | 6/2007 | Lee | |

(Continued)

*Primary Examiner* — Curtis Odom
(74) *Attorney, Agent, or Firm* — Quinn IP Law

(57) ABSTRACT

Securing a protected entity from a hazard may be achieved in a method and system by defining a first area (Safety SmartSpace) via a monitoring and control (M/C) device as a geographic zone monitored by monitoring systems. A second area (Safety Perimeter) is defined within the first area. The hazard is selected from a list. Additionally, the protected entity may be physically tagged with a local positioning device operable for providing known geographic coordinates of the protected entity. Proximity of the hazard is detected in the first area via the M/C device using input signals from the monitoring systems. The M/C device calculates a numeric criticality score for the hazard using a characteristic of the hazard and the protected entity. A localized control action executes with respect to the protected entity when the score exceeds a threshold, and includes generating and transmitting an alert signal to activate a warning device.

20 Claims, 28 Drawing Sheets

(56) References Cited

U.S. PATENT DOCUMENTS

2014/0066097 A1   3/2014   Kolodziej et al.
2014/0288995 A1   9/2014   Huff et al.
2014/0313044 A1*  10/2014  Thompson ............. G08B 21/10
                                              340/686.6

* cited by examiner

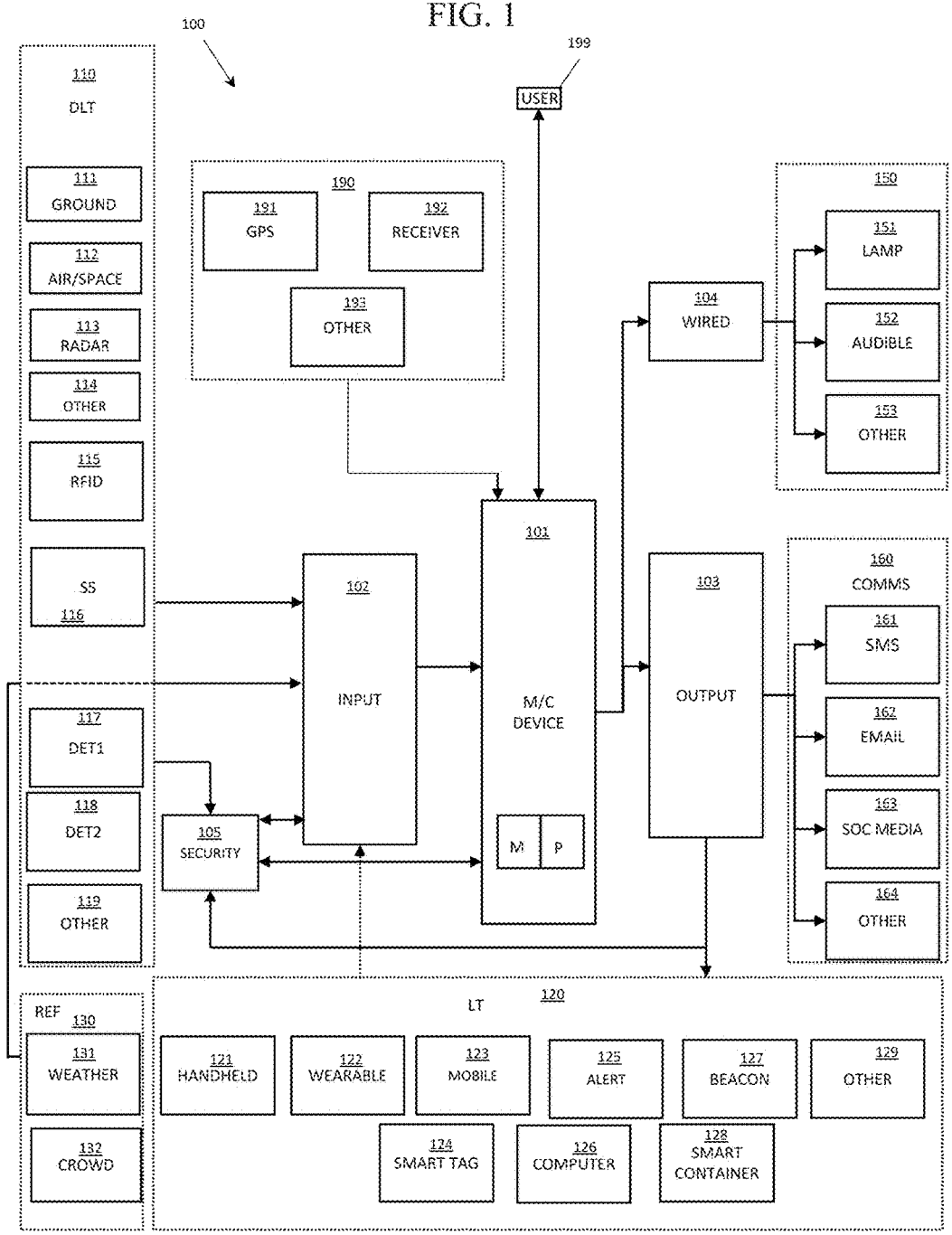

LOCALIZED HAZARD ALERT SYSTEM AND METHOD OF USE

TECHNICAL FIELD

The present disclosure relates to a localized hazard alert system and a method of using the same.

BACKGROUND

Ensuring the protection and security of one's person and one's property has been of paramount concern throughout human history. Potential hazards exists in many different forms, including naturally occurring hazards such as fire, lightning, earthquakes, high winds, other inclement weather, or natural disasters. Additionally, individuals face a wide range of hazards that are largely manmade, such as crime, civil unrest, infrastructure failures, and the like. Moreover, hazards that do exist typically are of varying levels of criticality based on the nature of the person or the property whose security is of concern. That is, hazards to a general population may be of little concern to a given individual and vice versa.

SUMMARY

The present disclosure pertains to a localized personal hazard alert system and a related method of use that are intended to enhance the overall security of a specified protected entity from a given hazard. For the purposes of this disclosure, the term "localized personal" refers to monitoring and control decisions made from the perspective of the protected entity as opposed to a general area or population. The term "protected entity" refers to any person, animal, object, building, or other entity whose safety and security is of concern to a user of the system and methodology described herein. The term "hazard" is any actual or potential source of damage or harm to the protected entity, whether manmade or naturally occurring. The present approach is ultimately intended to closely monitor, enforce, and enhance overall hazard awareness within a predefined static or dynamic virtual or physical space or area surrounding the protected entity.

As disclosed in detail below, the actions of a described monitoring and control (M/C) device and interconnected devices operating within the framework of a larger system are accomplished within a monitored personal security space, i.e., a designated first area referred to herein as a "Safety Smartspace" and directed toward identifying, characterizing, and controlling and/or informing other participating systems as to the hazards posed to the protected entity. In most embodiments, a smaller designated second area is defined within the Safety SmartSpace as a personal Safety Perimeter around the protected entity.

The described M/C device is configured, i.e., programmed and equipped, to monitor the Safety Perimeter within a larger Safety Smartspace. Locations of one or more safe states can be established or identified in or near the Safety Perimeter, with the hazards being static or dynamic. The M/C device may record locations of the safe states in memory and transmit directions to the safe states as part of a control action as described herein. The Safety Perimeter may likewise remain fixed or dynamic, e.g., the hazard may travel along with the protected entity and vice versa.

Hazards can be categorized as being either "safety-critical" or "non-safety-critical". Hazards are deemed herein to be safety-critical if the hazard could lead to physical or financial harm to the protected entity if the Safety Perimeter if not mitigated. For the purposes of this disclosure, mitigation refers to the process of rendering an existing hazard non-safety critical, for example, if possible, by moving the Safety Perimeter and the protected entity out of the vicinity or path of the hazard, redirecting the approaching hazard so that the hazard bypasses the Safety Perimeter, creating a new safe state in place or nearby to the Safety Perimeter, using an existing safe state, or otherwise neutralizing the hazard.

An example embodiment of a method of securing a protected entity from a hazard includes defining a designated first area ("Safety SmartSpace") via an M/C device, with the first area being a geographic zone, volume, or area monitored by a plurality of monitoring systems in communication with the M/C device. The method also includes defining a designated second area ("Safety Perimeter") within the first area via the M/C device, with the second area surrounding the protected entity. Additionally, the method includes selecting the hazard from among a predetermined list of potential hazards using the M/C device and physically tagging the protected entity with a local positioning device operable for providing known geographic coordinates of the protected entity. After this occurs, proximity of the hazard to the first area is detected using input signals from the monitoring systems. A numeric criticality score is calculated for the detected hazard using characteristics of the hazard and/or the protected entity. Ultimately, the M/C device executes a localized control action with respect to the protected entity, via the M/C device, when the numeric criticality score exceeds a calibrated threshold, wherein the localized control action includes at least generating and transmitting an alert signal to thereby activate a warning device.

A system is also disclosed that, in one possible embodiment, may include an M/C device and a local positioning device. The M/C device is in communication with monitoring systems and is programmed to secure the protected entity from a hazard within the designated first and second areas noted above. The local positioning device is in communication with the M/C device and is collocated with the protected entity. Memory of the M/C device is programmed with instructions that, when executed by the processor, cause the M/C device to execute the method noted above.

The above noted and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic example embodiment of a system for monitoring a Safety Perimeter around a protected entity for the presence of hazards as set forth herein, and for executing a control action when such hazards are detected.

DETAILED DESCRIPTION

Figure 1A:
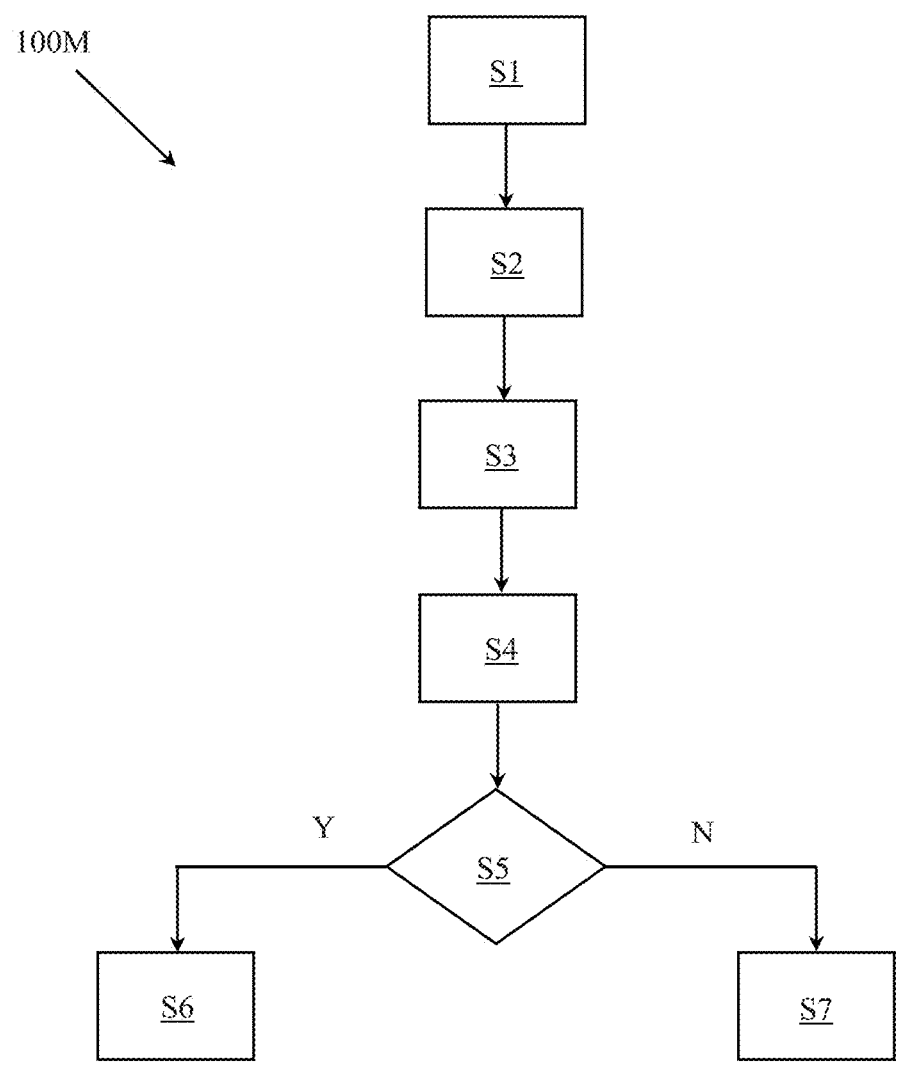
FIG. 1A is a flow chart describing a method of using the system of FIG. 1.

Referring to the drawings, wherein like reference numbers refer to the same or similar components throughout the several views, and beginning with FIG. 1, a localized hazard alert system 100 is depicted schematically to include a monitoring and control (M/C) device 101 having memory (M) and a processor (P). The M/C device 101 is in networked communication with various other subsystems and sources of information via a General Network (not shown). As used herein, the term "General Network" refers to any wired or wireless communication channels carrying encoded digital or analog data, e.g., Ethernet, WiFi, RF, Bluetooth, Cellular Data Network, DSRC, Radio Data Service, or other suitable networked information conduits or combinations thereof. The M/C device 101, which is programmed to execute a method 100M as shown in FIG. 1A to provide the requisite processing, configuration, communications, and control functionality disclosed herein, acts a central hub within the system 100 of FIG. 1 to provide safety-critical and non-safety critical hazard monitoring and reporting functions.

Referring briefly to FIG. 1A, an example embodiment of the method 100M begins with step S1, wherein the M/C device 101 defines or receives definitions of a designated first area. i.e., a "Safety SmartSpace", and a designated second area within the first designated area i.e., a "Safety Perimeter", both of which can be closely monitored by a plurality of different monitoring systems as described below with reference to FIG. 1. The Safety Perimeter of step S1 surrounds the protected entity, and may be any predefined geometric shape such as a circle, rectangle, sphere, or other closed path shape, or defined mathematically or geometrically. In an embodiment, a user of the method 100M may select a predefined shape from a menu of geometric shapes.

Alternatively, a user 199 of the M/C device 101 of FIG. 1 may physically traverse the Safety Perimeter and periodically record waypoints in memory (M) of the M/C device 101 as a series of two-dimensional or three-dimensional coordinates to describe a closed-path shape, e.g., a polygon. A computed closed-path boundary may be determined by processing physical measurements, still or video images, radar, sonar, lidar, and/or similar data to create a multi-dimensional boundary of the Safety Perimeter and Safety SmartSpace containing the Safety Perimeter. Boundary definition may occur using other means, such as a published map or mapping service or a traffic control system, e.g., a municipal air traffic control system.

In an embodiment that may be useful outdoors, the geographic characteristics of the Safety Perimeter and Safety SmartSpace may be captured mathematically in the form of two-dimensional or three-dimensional coordinates defined within a coordinate space described via, by way of example, the Global Positioning System (GPS) or equivalents, GLONASS or Galileo, or other forms of spatial coordinate measurement, navigation, or virtual boundary definition approaches such as geofencing. Alternative methods may include, but are not limited to, consultation of maps or mapping services, or RF-based, e.g., Bluetooth or NFC, optical, or sound-based estimation of distance to and/or shape of the safety perimeter and Safety SmartSpace described herein.

In an example embodiment suitable indoor use, within a vehicle, or in outdoor situations requiring higher levels of precision than are typically provided by GPS alone, the geographic characteristics of the safety perimeter and/or Safety SmartSpace can be captured mathematically in the form of two-dimensional or three-dimensional coordinates defined within a coordinate space or frame of reference described via microlocation, e.g., using RFID tags, iBeacons™, or interior geofencing. An example of such a situation exists within a space fitted with StickNFind™ indoor location beacon tags and solutions.

Step S2 may include identifying or defining particular hazard or hazards that the M/C device 101 of FIG. 1 is intended to monitor. Step S2 may entail selecting a hazard from a predetermined list of potential hazards using the M/C device 101, e.g., from a pull-down menu, with each hazard predefined and associated with particular types of information from the various monitoring systems within the larger system 100 shown in FIG. 1. For example, a user 199 of the M/C device 101 could access a pulldown menu in a web browser and select an item "range limit" to define a hazard as the protected entity leaving the Safety Perimeter defined in step S1. Or, the same user 199 could select "tornado", "thunderstorm", "lake", "downed power line", or any other predefined hazard from such a pulldown menu. The method 100M then proceeds to step S3.

Step S3 may include identifying, locating, and tracking the protected entity via the M/C device 101 of FIG. 1 using any of the approaches disclosed in detail later herein, e.g., known geocoordinates for stationary protected entities such as buildings or land, other devices such as electronic beacons, or RFID tags, RF transmitters, GPS receivers, or the like for stationary or potentially mobile protected entities such as people or pets. Step S3 may include physically tagging the protected entity with a local positioning device of any of the types discussed below, e.g., RFID tags, smart sensors, etc., operable for providing known geographic coordinates of the protected entity to the M/C device 101. Thus, upon completion of step S4 the protected entity and the Safety Perimeter around the protected entity within the larger Safety SmartSpace are well defined and known to the M/C device 101, as are the particular hazards to be monitored and ultimately protected against. The method 100M then proceeds to step S4.

Step S4 includes detecting proximity of the hazard to the protected entity within the Safety SmartSpace, with various ways for doing this within the system 100 of FIG. 1 set forth herein with reference to the remaining Figures. As will be described below, input signals from any or all of the monitoring systems, i.e., all of the available information sources shown in FIG. 1, may be fed as useful data into the M/C device 101 for quantitatively and qualitatively analyzing the predetermined hazards and defined Safety Perimeter. The M/C device 101 may receive information from an electronic beacon or other suitable device positioned with respect to fixed, stationary, or mobile hazards in some embodiments, with such beacons broadcasting geographic coordinates of the hazard. For mobile protected entities or hazards, the proximity of the hazard may be detected with respect to the protected entity and vice versa as part of step S3.

Step S4 may also include receiving images from a plurality of cameras as discussed below, with the M/C device 101 extracting geographical coordinates from the metadata of the images using known image processing techniques. The M/C device 101 can thereafter compare the extracted geographical coordinates from the images to known geographic coordinates of the defined Safety Perimeter to detect or otherwise determine proximity of the hazard.

Upon detection of the particular hazard identified in step S2, the method 100M proceeds to step S5 wherein the M/C device 101 of FIG. 1 next determines whether the detected hazard has yet reached an objective threshold of criticality. That is, the type of control action ultimately commanded by the M/C device 101 is intended to vary with the severity or other characteristic of the hazard and/or the protected entity, with the user 199 of the M/C device 101 defining the particular control action and/or allowing the M/C device 101 to autonomously determine such actions.

By way of example, the user 199 may predefine a numeric criticality threshold with respect to a given criteria. e.g., a particular distance to the protected entity or a particular level of severity of the hazard. As an example illustration, a hazard in the form of a thunderstorm over 20 miles away from the defined Safety Perimeter may be assigned a numeric criticality score of 0, 5-19 miles away a criticality score of 5, 1-4 miles away a criticality score of 7, and less than 1 mile away a criticality score of 10. The severity of the thunderstorm may be used to determine the criticality score in this example, either alone or with the distance to the Safety Perimeter. The M/C device 101 calculates or determines the numeric criticality score in real time using all available information regarding the characteristics of the protected entity and the hazard, e.g., the age or other physical quality of the protected entity, or the mental or physical capability or capacity of the protected entity, and then compares the numeric criticality score of the hazard to a corresponding threshold, with the threshold possibly dynamically changing with a trajectory of the protected entity and/or the hazard. If the threshold is met, the method proceeds to step S6. Otherwise the method proceeds to step S7.

Step S6 includes executing a localized control action via the M/C device 101 of FIG. 1 with respect to the protected entity, doing so in response to the detected presence of a threshold hazard in step S5. Again, the control action taken here may depend on both the nature of the hazard and its numeric criticality score or severity, with various possible control actions set forth herein, including generating and transmitting an alert signal to activate a warning device, e.g., a display screen, lamp, speaker, or other suitable warning device in possession of or worn by the protected entity, or otherwise monitored by a user of the method 100M. For instance, step S6 may include generating a message or other personal alert, illuminating a warning beacon or other warning device, broadcasting an audible alert message, or dispatching fire, police, or other assistance.

Step S7 is reached when the hazard detected at step S4 has not reached a level of severity or a numeric criticality score sufficient for triggering the M/C device 101 to execute a control action. The method 100M repeats step S1 and the intervening steps in this instance, but may include steps in preparation or anticipation of having to execute a control action should the hazard continue to evolve. One possible control action taken at step S7 could include the requesting of additional inputs from sources not already feeding the M/C device 101 of FIG. 1 so as to provide additional information regarding the hazard and its changing proximity, path, or other characteristic. While FIG. 1A shows one generic example embodiment of the present disclosure, those of ordinary skill in the art in view of the present disclosure will appreciate that other approaches may be taken within the intended inventive scope.

Referring again to FIG. 1, various interfaces exist to the General Network, including an input interface 102 (INPUT) and an output interface 103 (OUTPUT). The input interface 102 is any input/output (I/O) card or other I/O devices and associated software that provide input connectivity to the M/C device 101 from the General Network, with the output interface 103 in turn providing outputs to the General Network as needed. The system 100 may include locating devices 190, e.g., a GPS receiver 191 and a microlocation receiver 192, and possibly other location devices 193, any and all of which can be used to locate the protected entity and/or the hazard.

The M/C device 101, in conjunction with the other elements of the system 100 of FIG. 1 as will be explained with reference to the various Figures, is configured to coordinate and disseminate hazard-related information pertaining to hazards or potential hazards to the protected entity. The M/C device 101 also executes a control action with respect to the protected entity, and in so doing, may determine precisely when to issue a warning message and when to adjust the content of such a message based on the nature of the hazard to the protected entity. The M/C device 101 ultimately correlates and harmonizes all available data from multiple participating data sources in the system 100 to improve the accuracy of location, tracking, and characterization of the hazard with respect to the protected entity, and to tailor any alert messages or other control actions as needed.

Shown to the left in the schematic diagram of FIG. 1 are representative detection, locating, and tracking (DLT) devices 110, which may be embodied variously as cameras capturing still or video images in any band of the electromagnetic spectrum, including but not limited to the infrared and visible spectrums, whether positioned on or near the ground as ground cameras 111 or in an airborne or spaceborne platforms 112 such as balloons, drones, piloted aircraft, or satellites, or via local radar 113. Other identification and tracking sensors 114, RFID tags 115, and other smart sensors 116 may be used in addition to those mentioned above. The RFID tags 115 or smart sensors 116 may be attached to the protected entity in some embodiments, e.g., for accurate local tracking within the Safety Perimeter or Safety SmartSpace.

The system 100 may also include a security monitoring system 105, e.g., ADT or other monitored as known in the art over the General Network, which may communicate with individual smoke, fire, or flood detectors 117, entry detectors 118, and/or other security detectors 119 of the types used in common electronic security systems. The system 100 further includes location referencing devices (REF) 130 collectively used to establish a geographic reference location for the protected entity within the system 100. e.g., weather or other spotter services 131 such as National Weather Service broadcasts, Emergency Broadcast System, and iPAWS. The REF devices 130 can acquire advanced notice of distant and nearby hazards.

As part of such devices 130, crowdsourced information 132 may be collected from randomly dispersed persons or sources across a geographic area of relevance to the protected entity, each reporting hazard data from a different vantage point, e.g., via smartphones, tablets, or computers, with such data being available to the M&C device 101 over the general network. Crowdsourced information 132 may be compiled from multiple sources dispersed randomly across a geographic area and each reporting hazard details, fully or partially characterized, describing, i.e., detecting, locating, characterizing, and tracking, the same event or hazard from a different vantage point and executed via such devices as smartphones, electronics tablets, or personal computers. A broadcast service may be provided by the M/C device 101 or other devices offering improved accuracy and precision over hazard characterization conducted locally by a single source. For instance, the M/C device 101 may be configured to aggregate hazard data obtained via crowdsourced information 132, computing a more detailed characterization of all hazards characterized by this aggregated data, and subsequently supplying a more accurate and precise description of the hazard to subscribers to this data source based upon this detailed characterization for their use locally in processing hazards and providing directions.

Ad-hoc network (ANET) warnings may be delivered to the M/C device 101 about the Safety SmartSpace from a local monitor positioned at the site of the hazard and ANET relay of warnings via any crowdsourced observation reports described above. The ANET warnings are not delivered by traditional networks, such as radio broadcasts or the internet. Instead, ANET warnings may be relayed from device to device, each executing the functionality described elsewhere herein, and each acting as a relay station to other proximate devices to forward the hazard description and characterization.

Additionally, various warning devices 150 may be connected to the system 100 via a wired or wireless connection 104 and used to provide an audible and/or visible alert to the protected entity when a hazard is impending in proximity to the protected entity. Warning devices 150 may be of a traditional or legacy nature, e.g., lamps, horns, bells, or other such components not typically provided on a screen of a computer device. Warning devices 150 may be required for other purposes by law or for industry use, or are generally more recognizable, and therefore the present disclosure contemplates inclusion of such devices 150.

In at least one embodiment the traditional output of said warning devices, lamp, bell or horn, driven or activated instead by other warning systems, are detected by the M/C device describe herein, which then incorporates this form of hazard characterization into its localized hazard assessment.

Communications services (COMMS) 160 may be used to help disseminate such alerts or warnings to the protected entity or a person/source monitoring the protected entity.

Location and tracking (L/T) mechanisms 120 shown at the bottom of FIG. 1 may include handheld devices 121 such as tablet computers or cell phones, wearable devices 122 such a smart watches or badges, information from transport vehicles, automobiles, aircraft, and vessels 123 in proximity to the protected entity, smart tags 124, security systems 125, personal or embedded computers 126, iBEACONS 127, Smart Containers 128, and other such devices 129. The L/T mechanisms 120, any or all of which may have built-in or externally-attached sensors, have digital capability and the ability to communicate over the general network, with electronic output displays and relayed I/O devices such as keyboard and touchscreens, and thus can function as platforms for hosting and/or executing all or part of the functionality described herein.

The computers 126 noted above, which may include such devices as personal computers, laptop computers, and notebook computers, may provide a traditional platform for participating with the M/C device 101 in monitoring and control with significant power but potentially limited portability. One embodiment may include the computers 126, alone or with the M/C device 101, performing monitoring and control from a centralized, fixed location and being by data sources occasionally within them, but more often remote from them and delivering their data via the General Network. An additional embodiment has warning devices and displays driven by the computers 126 in the same fashion, and/or driven remote from the computers 126.

The handheld devices 121 may host and/or execute portions of the monitoring and control functions of the M/C device 101 to allow such functions to move while executing the disclosed tasks. Likewise, the wearables 122 represent platforms operable for sensing body characteristics and vital signs, and also may serve as platforms for hosting and/or executing warning devices and displays. The vehicles, aircraft, and vessels 123 may be fitted with advanced electronics built upon embedded computing platforms. Such platforms are convenient platforms for monitoring and control within the scope of the present disclosure.

Additionally with respect to the L/T mechanisms 120, the iBeacons 127 of the type known in the art are configured for the purpose of marking fixed hazards and narrowcasting their description, characterization, classification, and location electronically within the Safety SmartSpace contemplated herein. Any devices used for monitoring and warning herein, including the M/C device 101, can receive updates about the states of any predetermined or emerging hazards, and also the distance to such hazards and the relative velocity of approach of the hazards.

The smart tags 124 referenced above are devices known in the art to provide hazard data about the hazard or protected entity to which such smart tags 124 are attached, but also to serve as a warning platform in the same manner as wearables noted above when attached to a protected entity, e.g., a pet. One embodiment of a smart tag is a local positioning device attached to or integrated with an electronic pet collar. In particular, it is foreseen that pets can be trained to respond to simple warnings or alert signals emanated by the tag so as to avoid, or retreat from, local hazards they are approaching. Thus, in an embodiment the collar may receive an audible message as a localized control action, with the audible message serving as the alert signal.

With respect to the smart containers 128, such mechanisms are self-identifying packages within the Safety SmartSpace, e.g., boxes, pillboxes, safes, etc., that hold potentially hazardous materials and render them safe, and/or hold and shield valuables from hazards. Smart containers may broadcast or narrowcast their characteristics or presence, either electronically, audibly, or optically (via SmartLabel™), as well as the characteristics of the hazard cooperatively within the Safety SmartSpace so that other devices in the system 100 of FIG. 1 can be made aware of the hazards. As is known in the art, broadcasting may refer to sending of a mass media message to a large audience, while narrowcasting may be directed to a specific audience. Means of broadcast or narrowcast include the General Network and/or via physical labels attached to them carrying specialized bar codes that are readable optically or visually at a distance (also Smart Labels™). In another embodiment, such smart containers can also act as monitors and warning devices monitoring the environment around them for approaching hazards, or if they are carried or transported, as they approach hazards.

Safety SmartLabels™ as known in the art are physical labels that are self-identifying within the Safety SmartSpace when attached to objects within the Space. In one embodiment, such labels are attached to an ordinary container to transform the container into a form of smart container, e.g., optically detected and monitored. Traditional electronic security systems 125 can also host and/or execute the monitoring and control function, also having existing connections to data sources and warning devices, some via the General Network in addition to traditional wired connections.

In a basic embodiment, sensing, monitoring, control and warning are all hosted and/or executed on a single multipurpose device. In other embodiments, such capability is supplemented by remote sensing over the General Network. The multipurpose device supplements other devices by issuing warnings over the general network. In still another monitoring and control are handled by a dedicated device of this type with sensing, warning, or both being handled by other devices of this type. In at least one embodiment, an Automated Hazard Warning may be issued as the hazard is approached, and relayed in physical form, i.e., not transmitted via radio or electronically in any way, but issued by dedicated devices at the site of the hazard, including for instance illuminated warning signs or audible devices in the presence of, or upon the appearance or approach of, a nearby moving safety perimeter.

Figure 2:
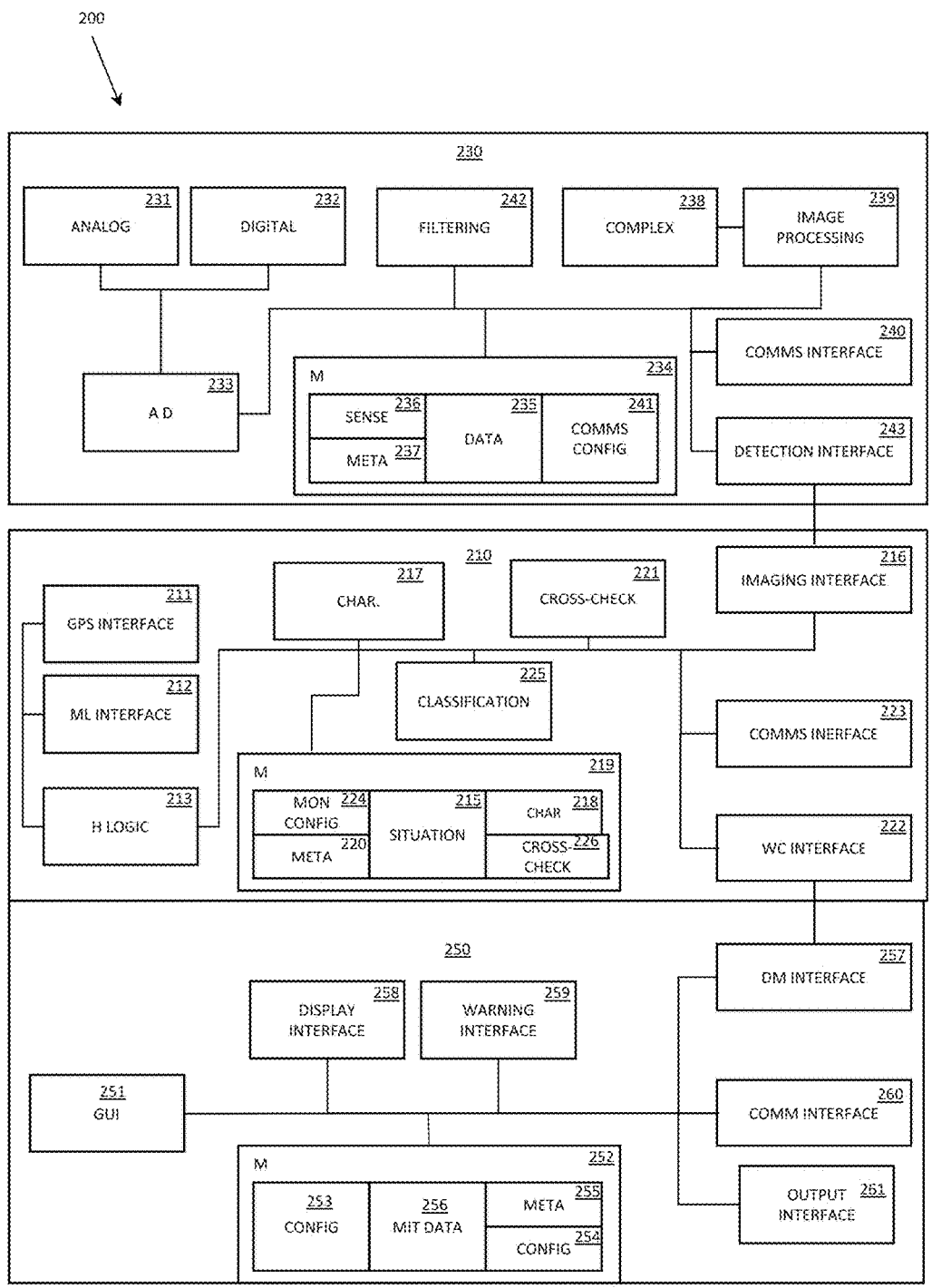
FIGS. 2-4 schematically depict different aspects of a localized safety space monitor usable within the system shown in FIG. 1.
Figure 3:
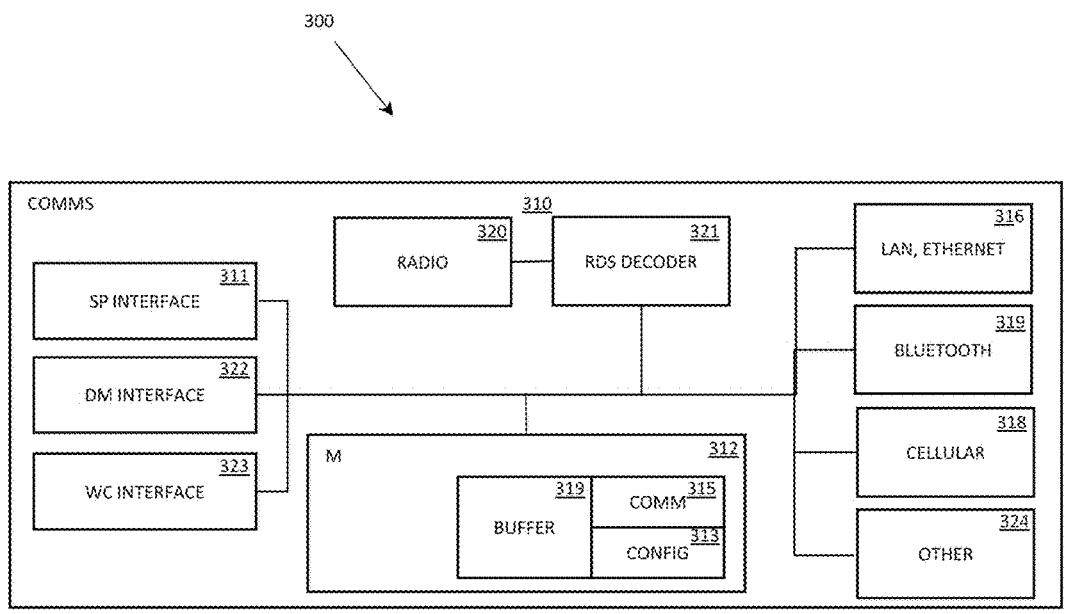

FIGS. 2-3 together illustrate embodiments 200 and 300 of a Localized Safety Space Monitor. A Detection and Monitoring Platform 210, a Sensing and Imaging Platform 230, a Warning and Control Platform 250, and a Communications Platform 310 (FIG. 3) are included in this implementation, which may be hosted for example by the M/C device 101 of FIG. 1. Local Memory 219 may be used to temporarily store data and calculated values used within the platform 210, such as situation data 215, characterization metadata 218, classification metadata 220, cross-check data 226, and monitoring configuration data 224.

Within the platform 210, a GPS interface 211 retrieves coarse location information from the GPS Receiver 191 of FIG. 1 or another GPS receiver for the purpose of determining the geographical location of the protected entity and/or hazard. An additional microlocation interface 212 is provided within the platform 210 for the purpose of retrieving fine location information from a microlocation source. These two forms of location data are used in order to provide an accuracy of location sufficient to monitor the protected entity to a minimum distance, e.g., of 10 cm, as well as in basic confirmation of agreement on coarse location. Harmonization logic 213 may be employed to reconcile data from the two in order to provide a specific set of location coordinates.

Additionally, characterization logic 219 discriminates between individual hazards, between individual potential hazards, between these two types, between individual protected entities. Additional classification logic 225 provides a quantification of a Safety Criticality Level (SCL) for each hazard or potential hazard being monitored. Cross-check logic 221 compares specific values contained with information provided by and received from multiple sources of hazard data, together with the classification logic and harmonization logic, in order to determine the corresponding most probable true values when such data is not consistent between sources. The logic 221 may also perform analysis to determine if any source of data feeding into the M/C device 101 of FIG. 1 is likely to be reporting data that is untrue, providing an elementary level of security protection from "spoofed" (intentionally incorrect) data being treated as though it is true.

A Sensing and Imaging Platform interface 216 may be used to manage the cooperative exchange of data with the platform 230. The interface 216 is the source of data local to the platform 210 and coming from the platform 230. It is also the destination local to the platform 210 for commands going to the platform 230.

Still referring to FIGS. 2 and 3, a Warning and Control Platform interface 222 employs logic to manage the cooperative exchange of data with the Warning and Control Platform 250. This particular interface 222 is a source of data local to the Detection and Monitoring Platform 210 and coming from the Warning and Control Platform 250. It is also the destination local to the Detection and Monitoring Platform 210 for data and commands going to the Warning and Control Platform 250. Additionally, a Communication Platform interface 223 employs logic to manage the cooperative exchange of data with the Communication Platform 310 of FIG. 3. This interface is the source of data local to the Detection and Monitoring Platform and coming from the Communication Platform 310 of FIG. 3. It is also the destination local to the Detection and Monitoring Platform 210 for data and commands going to the Communication Platform 310.

Within the Sensing and Imaging Platform 230 of FIG. 2 are two basic sensor interfaces and one complex sensor interface used to relay data from sensors external to the Sensing and Imaging Platform 230, yet fitted to the host device after manufacture, or those manufactured into the host device by its manufacturer. A Sensor Interface for Analog 231 receives sensor signals from analog sensors and converts them to digital form, and a logically equivalent Sensor Interface for Digital Sources 232 receives sensor data from digital sensors. Both sources feed digitized data to Sensing Logic for Analog and Digital Data 233 whose purpose is to manage the timing and protocol of the data acquisition process. Filtering Logic 242 of the type known in the art may be used to remove noise and/or unwanted interference from the data.

The depicted embodiment of FIG. 2 also contains a Sensor Interface for Complex Sources 238, which is used to manage data interchange with complex sensing devices such as cameras, imagers, lidar, and other forms of complex detection. This interface feeds data to processing logic 239 which is present in order to distill usable information about the protected entity, hazards, and potential hazards from the complex datasets provided by these devices as well as to send commands to them for the control of the sensing process.

This embodiment also contains a Detection and Monitoring Platform interface 243 employing logic to manage the cooperative exchange of data with the Detection and Monitoring Platform 210. Interface 243 is the source of data local to the Sensing and Imaging Platform 230 and coming from the Detection and Monitoring Platform. It is also the destination local to the Sensing and Imaging Platform for data and commands going to the Detection and Monitoring Platform.

The embodiment of FIG. 2 also contains a Communication Platform interface 240 employing logic to manage the cooperative exchange of data with the Communication Platform 310. The interface 240 is the source of data local to the Sensing and Imaging Platform and coming from the Communication Platform 310 of FIG. 3. This data is typically consists of information from sensors remote to the Sensing and Imaging Platform 230, frequently remote as to the host, e.g., the M/C device 101 of FIG. 1. Local Memory 234 may be used to temporarily store data and calculated values used within the Sensing and Imaging Platform 210 such as Captured Sensing Data 235, Sensing Configuration Data 236, Sensing Metadata 237, and Communications Configuration Data 241.

Within the Warning and Control Platform 250 of FIG. 2 are found a user interface and two warning interfaces. The user interface 251 is included to allow the user 199 of FIG. 1 to configure the Localized Safety Space Monitor, e.g., the M/C device 101 of FIG. 1 and/or the computers 126, set a safety perimeter, provide basic description of any protected entities, facilitate inputting the means for monitoring such entities, to initiate monitoring, and to issue warnings or execute other control actions as appropriate.

A complex Display Interface 258 may be used to generate and provide instructions to the user 199 for invoking or achieving a safe state when in the presence of a hazard, and a Warning Output Interface 259 for the purpose of relaying the existence of any unsafe condition to the user 199. A Detection and Monitoring Platform interface 257 may employ logic to manage the cooperative exchange of data with the Detection and Monitoring Platform 210. This interface 257 is the source of data local to the Warning and Control Platform and coming from the Detection and Monitoring Platform. It is also the destination local to the Warning and Control Platform for data and commands going to the Detection and Monitoring Platform.

Additionally, a Communication Platform interface 260 employs logic to manage the cooperative exchange of data with the Communication Platform 310 of FIG. 3. This interface 260 is the source of data local to the Warning and Control Platform 250 and coming from the Communication Platform 310, and is also the destination local to the Warning and Control Platform 250 for data and commands going to the Communication Platform 310. Local Memory 252 may be used to temporarily store data and calculated values used within the Warning and Control Platform 250 such as the User Configuration Data 253, Warning Configuration Data 254, Warning Metadata 255, and Hazard Mitigation Data 256.

Within the Communication Platform 310 of FIG. 3 are found a radio subsystem and several network interfaces. That is, a radio receiver 320 is included and present for the purpose of receiving broadcast radio signals containing encoded hazard information provided by local authorities and local news sources. This receiver feeds an RDS decoder 321 for the purpose of demodulating the incoming detected radio signal to extract the encoded hazard information. A LAN Interface 316 establishes a communication link with the various forms of Ethernet networks (IEEE 802.11x), a Bluetooth Interface 319 for localized communications with RF ID tags, Smart Tags, wearables and other devices, a cellular interface 318 for linkage to one of more of the traditional cellular communications networks, and other network interfaces 324 for as-yet-undefined services, topologies, and physical layers to come forth from the communications infrastructure in the future.

Additionally, a Sensing and Imaging Platform interface 311 employs logic to manage the cooperative exchange of data with the Sensing and Imaging Platform 230 of FIG. 2. The interface 311 is the source of data local to the Communication Platform 310 and coming from the Sensing and Imaging Platform 230. It is also the destination local to the Communication Platform 310 for data and commands going to the Sensing and Imaging Platform 230 of FIG. 2.

A Detection and Monitoring Platform interface 322 employs logic to manage the cooperative exchange of data with the Detection and Monitoring Platform 210. This interface 322 is the source of data and commands local to the Communication Platform 310 and coming from the Detection and Monitoring Platform 210 of FIG. 2. It is also the destination local to the Communication Platform 310 for data going to the Detection and Monitoring Platform 210. Also, a Warning and Control Platform interface 323 employs logic to manage the cooperative exchange of data with the Warning and Control Platform 250. This interface 323 is the source of data local to the Communication Platform 310 and coming from the Warning and Control Platform 250. It is also the destination local to the Communication Platform 310 for data and commands going to the Warning and Control Platform 250. Local Memory 312 is used to temporarily store data and calculated values used within the Communication Platform such as Data Buffer Memory 319, Communications Configuration Data 313, and Communications Metadata 315.

Figure 4:
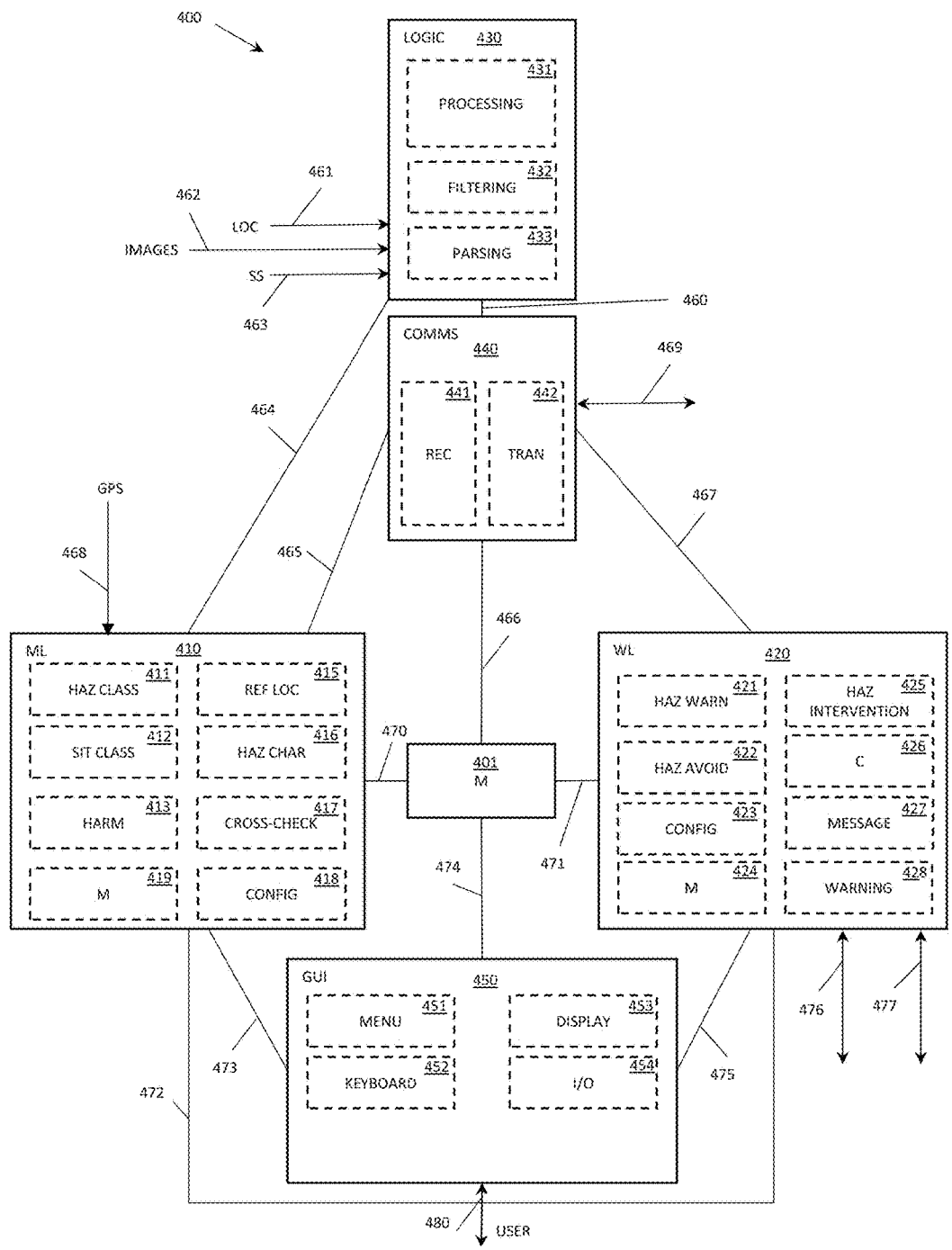

FIG. 4 illustrates an example embodiment of a Localized Safety Space Monitor 400 with a common communications and execution architecture to execute the tasks required to perform the Localized Safety Space Monitor functionality. The Monitor 400 may include a Main Memory Module 401. Monitor Logic 410, Warning Logic 420, Sensing Logic 430, a Communications Module 440, and a User Interface 450.

Within the Sensing Logic 430 are one module and logic for the processing of incoming signals and data such as from local sensors 461 or security system detectors 463. Filtering Logic is present for the purpose of excluding or removing noise and unwanted information from all incoming signals and data streams. Parsing Logic 433 is also present, this for the purpose of extracting encoded sensor data from the protocol information surrounding it and added to it in order to support transmission over the General Network or by other encoded means.

The embodiment of FIG. 4 also includes an Image and Video Complex Processing Module 431 for the purpose of extracting information about the protected entity, hazards and potential hazards from images both still and moving, including those taken in the visible light, infrared or ultraviolet spectra, or similar data taken using radar, lidar, sonar or other similar means 462. The embodiment of FIG. 4 allows for the transfer of data to and from the Monitor Logic 410, including transfer of commands from the Monitor Logic 410 that govern data acquisition and transfer of data to the Monitor Logic 410 in return 464, and data 465 to/from the Communications Module 440, including but not limited to incoming sensor data 460 received from the General Network 469, or other networks or means.

Within the Monitor Logic 410 is found logic that conducts and controls monitoring of hazards and potential hazards, and protected entities, executing four major functions. A Reference Location Module 415 is present for the purposes of establishing the precise geographic location of a host device, whether the handheld device, personal computer, laptop computer, or notebook computer noted above. This is performed by processing signals 468 from the Global Positioning System and microlocation systems in or near the host, GPS providing coarse and primarily outdoor location data, and microlocation providing fine and primarily indoor location data.

Hazard Characterization Logic 416 processes data about hazards and potential hazards in order determine where they are, if the hazards are moving, in which direction such hazards are moving, and the type of hazard. Additional logic, labeled Hazard classification Logic 411 in FIG. 4, may determine the numeric Safety Criticality Level (SCL) of each hazard for use in determining if the SCL meets threshold criteria indicative of whether to issue a warning about the hazard, and which hazard to address first in case more than one is imminent or present.

Also within FIG. 4 is a Harmonization Module 413, which is present for the purpose of comparing similar or same information from multiple sources in order to determine the most precise estimate of the actual measurement from which the data has come. One example of harmonization is the comparison of GPS and microlocation data 468 in order to arrive at the most accurate estimate of actual location possible. Since both data types have some amount of inherent error in their estimates, melding the two data types together in the harmonization process results in reduction of the total error below that of either one individually.

Also within the embodiment of FIG. 4 is a Cross-Check Module 419 which compares similar or same information from multiple sources as well, however unlike the Harmonization Module this module conducts its comparison in order to determine if a harmonized version can be created when there is a significant difference in the data provided by them. It is also present to weed out spoofed data, i.e., purposely inaccurate data, that may be generated by sources that cannot be confirmed as trustworthy. A Local Memory Module 419 handles storage of interim values during the execution of the functionality within the Monitor Logic, and Configuration Logic 418, which is used to set up the Monitor Logic prior to use.

Within the Warning Logic 420 shown to the right in FIG. 4 is found functionality that assembles and issues warnings, taking into consideration the observed characteristics of hazards and potential hazards, and protected entities and items to be protected. It is fed with data carrying this information 467 from the Monitoring Logic 410, such as SCL ordered by hazard, thus providing a clear indication of the situation in order to determine if issuance of a warning is necessary. Hazard Warning Assembly Logic 421 may be used to generate the most appropriate warning, especially if more than one hazard is present.

Still referring to FIG. 4, Hazard Avoidance and Mitigation Guidance Logic 422 is used to generate a specific plan of action to mitigate all hazards that present a danger. One course of action that can be taken in mitigation is to prompt the protected entity, via a portable device in some embodiments, with directions to the safe state. This enables the protected entity to be directed out of harm's way to the nearest safe location, i.e., a nearby shelter, geographical safe state, or other secure site. Another involves providing instructions for rendering a hazard inert, e.g., shutting down a furnace that is overheating, this being an in-place physical safe state. Both are supported by Message Construction Logic 427 that assembles such messages, directions, and instructions in proper formats to be understood upon receipt by automated systems or by reading if performed by humans.

Another possible course of action is to provide a simple warning with its implications understood inherently, or conveyed in training at first use. The Warning Logic 420 contains a Warning Device Module 428 that feeds this kind of warning to Hardware Warning Devices 476, usually located external to the host but within the Localized Safety Space being monitored.

Also within at least one embodiment can be found a Control Module 426 and Hazard Intervention Control Logic 425, which constructs and transmits a command to a smart hazard to mitigate itself by transitioning to a safe state. This command can be sent out over the General Network 469 with the assistance of the Communication Module 440 via data 467. It can also be sent out as a non-smart common electrical signal, un-encoded or lightly encoded, via the Control Module 426 through the connection labeled "Hardware Hazard Intervention Control" 477. A Local Memory Module 424 stores interim values during the execution of the functionality within the Warning Logic, and Configuration Logic 423, which is used to set up the Warning Logic prior to use. The Warning Module and the Monitor Module frequently exchange data 472 in the course of the execution of the functionality found within the two.

Within the Communication Module 440 of FIG. 4 are receiver and transmitter modules. Within this embodiment a Network Receiver Module 441 is provided to process commands, messages and data received over the General Network. Also provided is a Network Transmitter Module 442, this for the purpose of processing commands, messages and data to be transmitted over the General Network. These modules are capable of handling receiving and transmitting over all communication variants defined under the concept of the General Network described herein, including all forms of Ethernet (IEEE 802.11x), all forms of Bluetooth, all Cellular Network protocols, all CAN protocols, and will be expected to handle any other new and related network communications concepts that are forthcoming. The Communication Module sends data to and receives data 464 from the Monitor Logic 410, sends data 460 to and receives data 460 from the Sensing Logic 430, and sends data 467 to and receives data 467 from the Warning Logic 420 during the execution of the functionality found within the three.

Within the User Interface 450 is found the functionality necessary to allow a user to configure the Localized Safety Space Monitor, identify protected entities, items to be protected, local hazards, and local potential hazards, select or enter a Safety Perimeter boundary, and select the type and style of warning to announce when one is required. Menu Logic 451 may be used to present options to the user 480, which may be the same as user 199 of FIG. 1, and a Keyboard and Touchscreen Logic 452 may be used for accepting inputs from the user in response. Moreover, Display Logic 453 can present menus and maps for consideration by the user, and an Interactive Map I/O Module 454 for accepting user input requiring geographical coordinates, locations, features or waypoints and conveying same back to the user. This module is also the means for providing graphical directions to the nearest safe harbor (geographical safe state) if it is geographically removed from the user's current location. The user interface communicates locally 477 with the Monitor Logic 410 and also communicates locally 475 with the Warning Logic 420 during the execution of the functionality found within the three.

Within the Main Memory Module 401 is found memory that is shared among all Logic units and the Communication Module 300 of FIG. 3, transmitted as data 470 and received locally to or from the Monitor Logic 419, to or from the Communication Module 300 as with data 466, to or from the Warning Logic 420 as data 471, and to or from the User Interface 450 as the data 474. This memory handles storage of interim values and values to be transmitted or received within the Localized Safety Space Monitor during the execution of the functionality within it.

Figure 5:
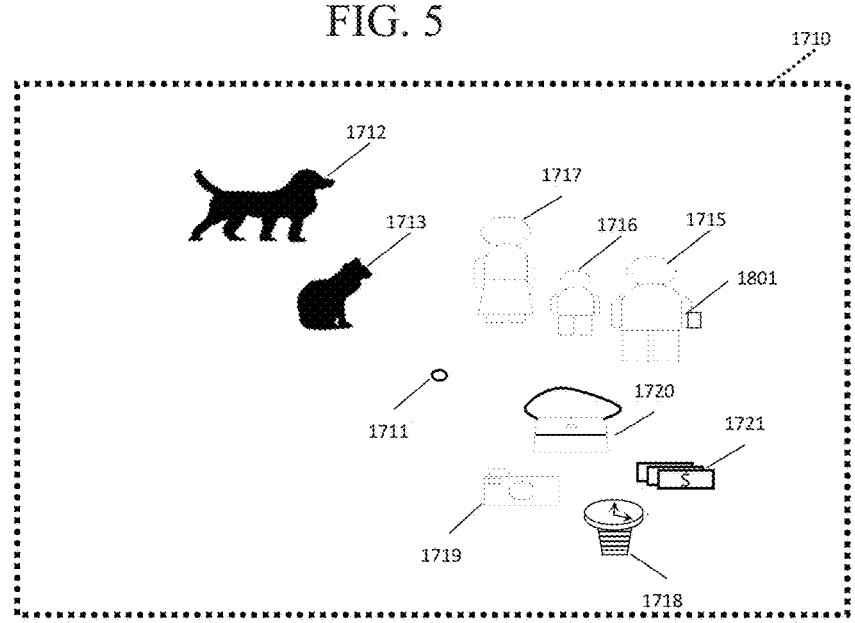
FIGS. 5 and 6 are schematic example representations of a virtual Safety Perimeter for the personal safety space described herein, with FIG. 6 depicting the use of RFID tags or other tracking devices attached to the protected entity.

FIG. 5 illustrates one possible embodiment 1700 in which a square-shaped virtual and localized safety perimeter 1710 is centered on or about a reference point 1711 used as a datum to establish an equivalent square in real geographical space, although invisible to the eye. This is the limit of the Localized Zone of Protection and surrounds the protected entity, such as parents 1717, 1715 and children 1716, and/or pets such as dogs 1712 or cats 1713, and/or items to be protected including valuables, such as watches 1718, cameras 1719, purses 1720, and cash or currency 1721. Although a two dimensional perimeter 1710 is shown, a three dimensional boundary is also possible within the intended inventive scope.

A handheld device 1801 may be held by a person within the space of FIG. 5. In such an embodiment, the handheld device 1801 may use one or more sensors, typically but not specifically limited to a still camera and/or video camera, to detect, classify, identify, locate, and track local or nearby hazards and protected entities. In this embodiment, the display and audio system of the handheld device 1801 may be used as outputs for warnings from the M/C device 101 of FIG. 1 or any of the other devices shown in FIG. 1.

Figure 6:
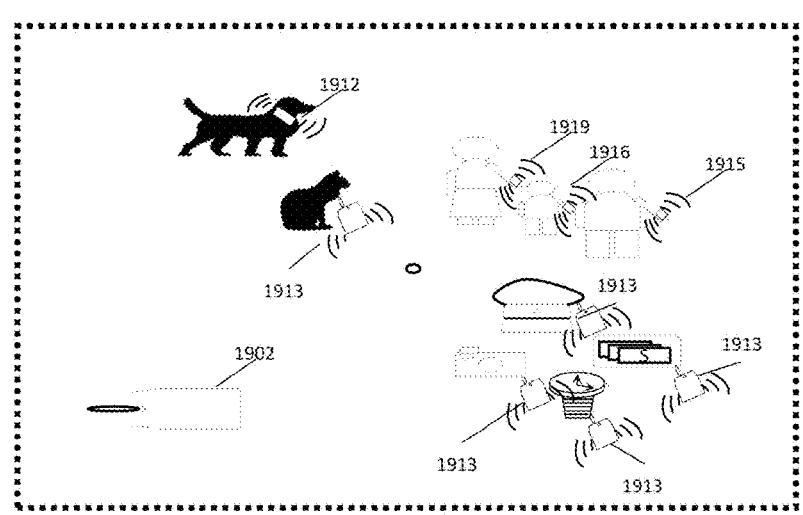

FIG. 6 illustrates a specific embodiment 1900 in which the identities and locations of protected entities are detected, classified, located, and tracked using data provided by RFID Tags 1902, wearables 1915, 1916, and 1919, or smart tags 1912, 1913 attached to the protected entity. As protected entities move, their locations may be tracked by the M/C device 101 of FIG. 1 using the handheld device 1801 of FIG. 5, which may subsequently display a warning and alarm when approaching or about to cross over the perimeter 1710. The most basic hazard or potential hazard being tracked in this embodiment is simply the departure of the protected entity from the Localized Safety Space or perimeter 1710.

Figure 7:
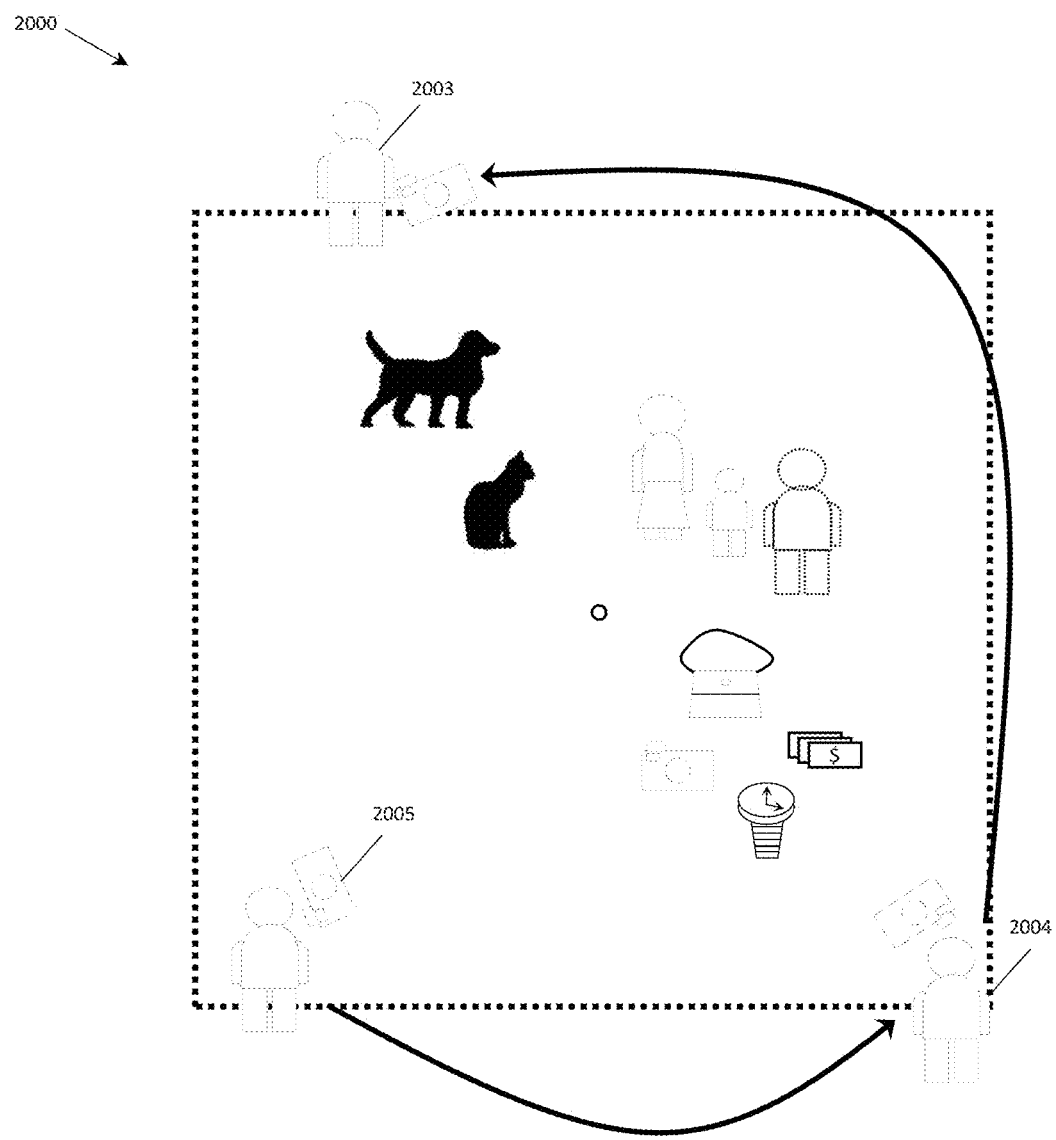
FIGS. 7 and 8 are schematic illustrations of an embodiment using virtual tags.

FIG. 7 illustrates a specific embodiment 2000 in which equivalent virtual tags are created via a process of photographing or recording video of the space being monitored, from each of three positions spread approximately equally around its perimeter, here the locations illustrated 2003, 2004, and 2005. Such an image set or video is then processed in order to identify (tag virtually) each protected entity and record the initial locations within the Localized Safety Space. Subsequent imaging or video, taken continuously or at regular intervals, is used to track motion in this way, subsequently displaying a warning and sounding an alarm when any one of them is approaching, or about to cross over, the boundary, thus exiting the Localized Safety Space.

Figure 8:
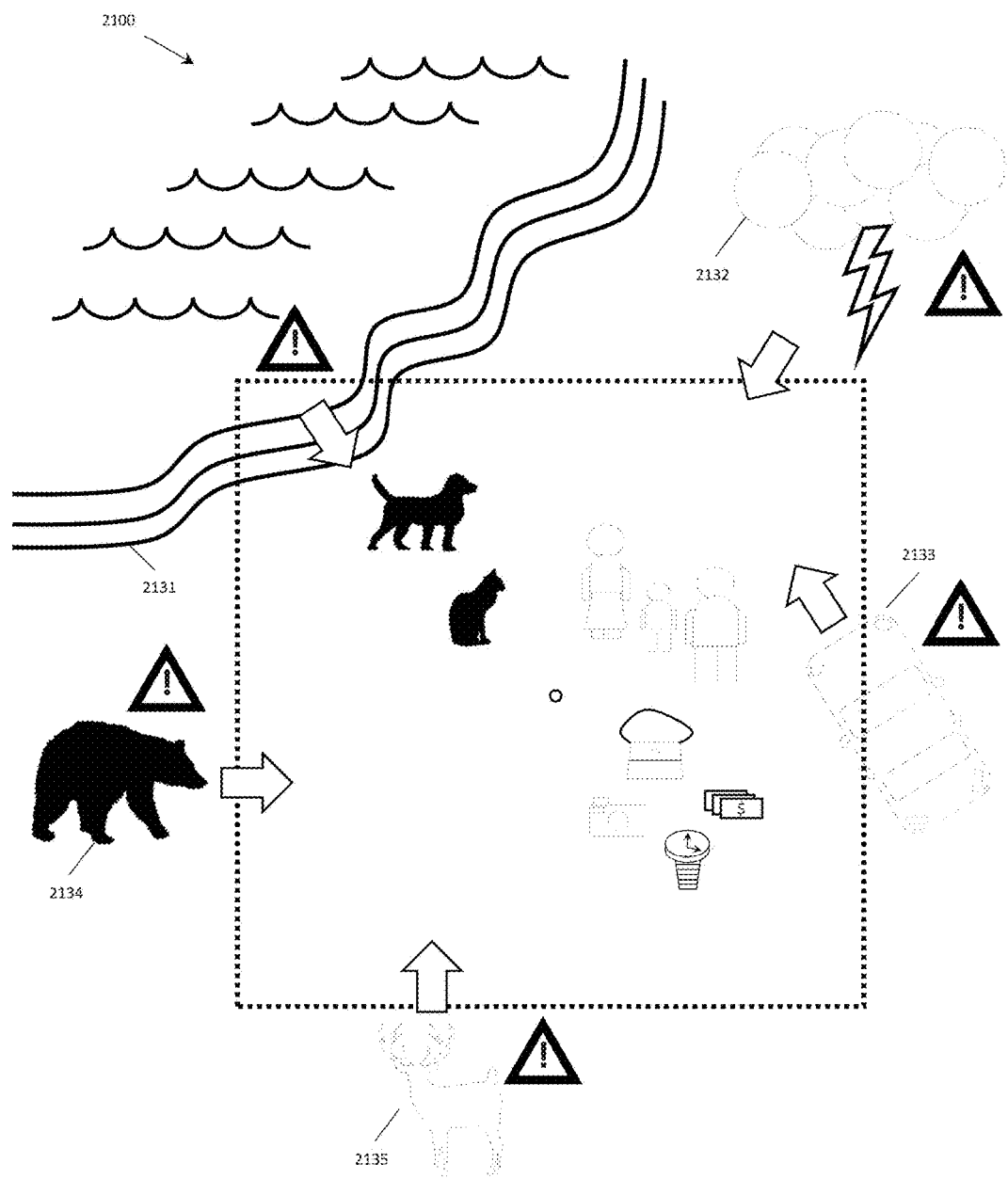

FIG. 8 illustrates a specific embodiment 2100 in which the Localized Safety Space Monitor also detects, classifies, identifies, locates and tracks nearby hazards that are approaching, or potentially could approach, or entering, or about to enter, the boundary or perimeter, in this case from its outside. These could include hazards such as flooding 2131, approaching storms 2132, vehicles in motion 2133, wild animals such as bear 2134 or deer 2135, or other hazards. Subsequent tracking of these hazards or potential hazards, via imaging or video, taken continuously or at regular intervals, is used to track their motion, to subsequently display a warning and sound an alarm when any one of them is approaching, or about to cross over, the boundary, thus entering the Localized Safety Space.

Figure 9:
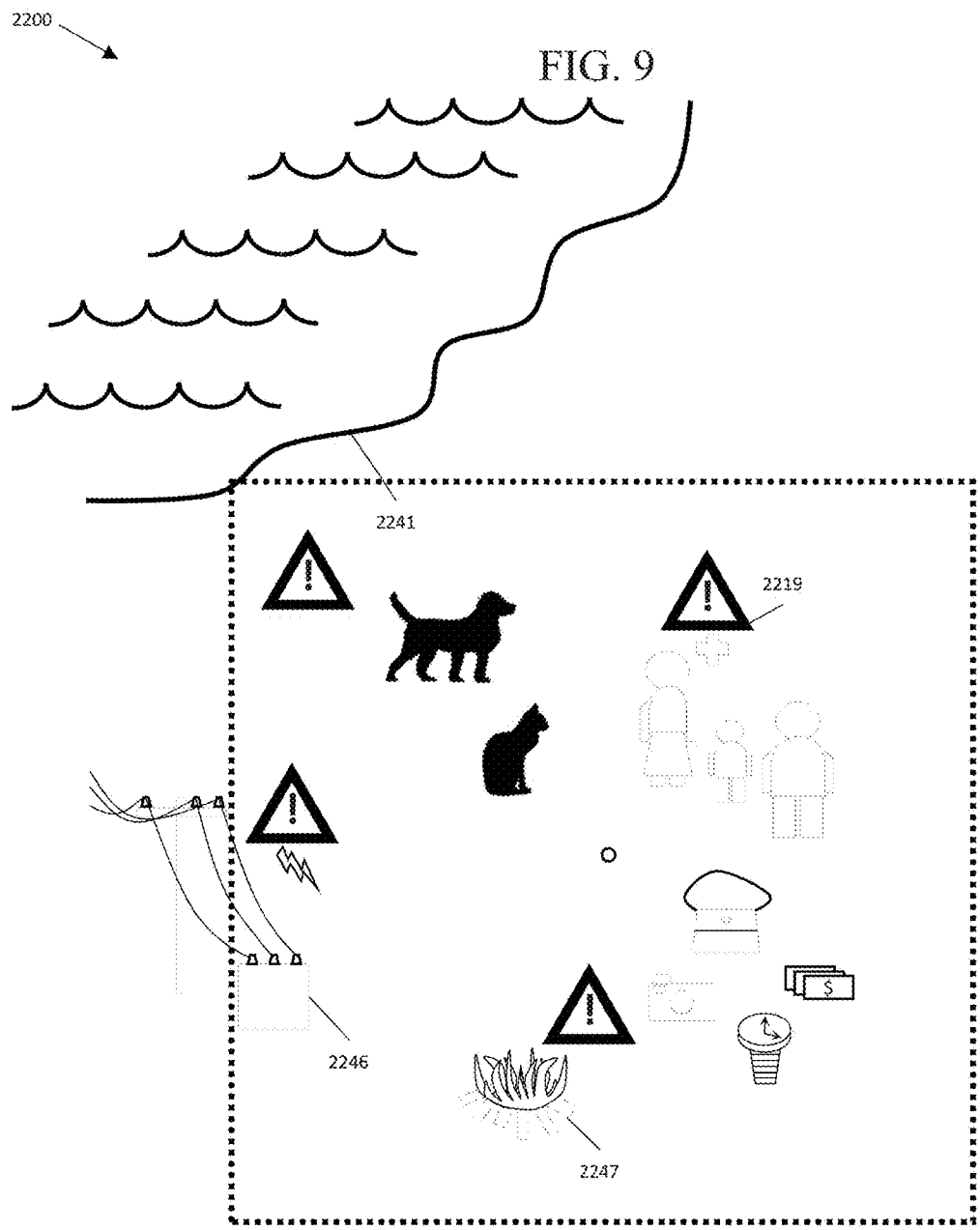
FIGS. 9-13 are different schematic illustration of a localized safety space with additional hazards and varying sources of hazard identification.

FIG. 9 illustrates another embodiment 2200 with the same Localized Safety Space seen in FIG. 8, but also includes additional hazards and potential hazards, both moving and stationary, these also within the Localized Safety Space. Such hazards and potential hazards include moving objects, stationary objects, sources of injury and potential sources of injury, and physical characteristics that imply potential harm. Specifically pictured are hazards such as a person's health (perhaps being monitored electronically and found to have a critical imbalance) 2219, a nearby beach 2241 on a lake into which someone could accidentally fall (and that intrudes into the defined Localized Safety Space when its boundary is set up but is not rising due to flooding), electrical apparatus 2246, a campfire 2247. Other such hazards, not pictured, could also exist and could be monitored at this level.

Figure 10:
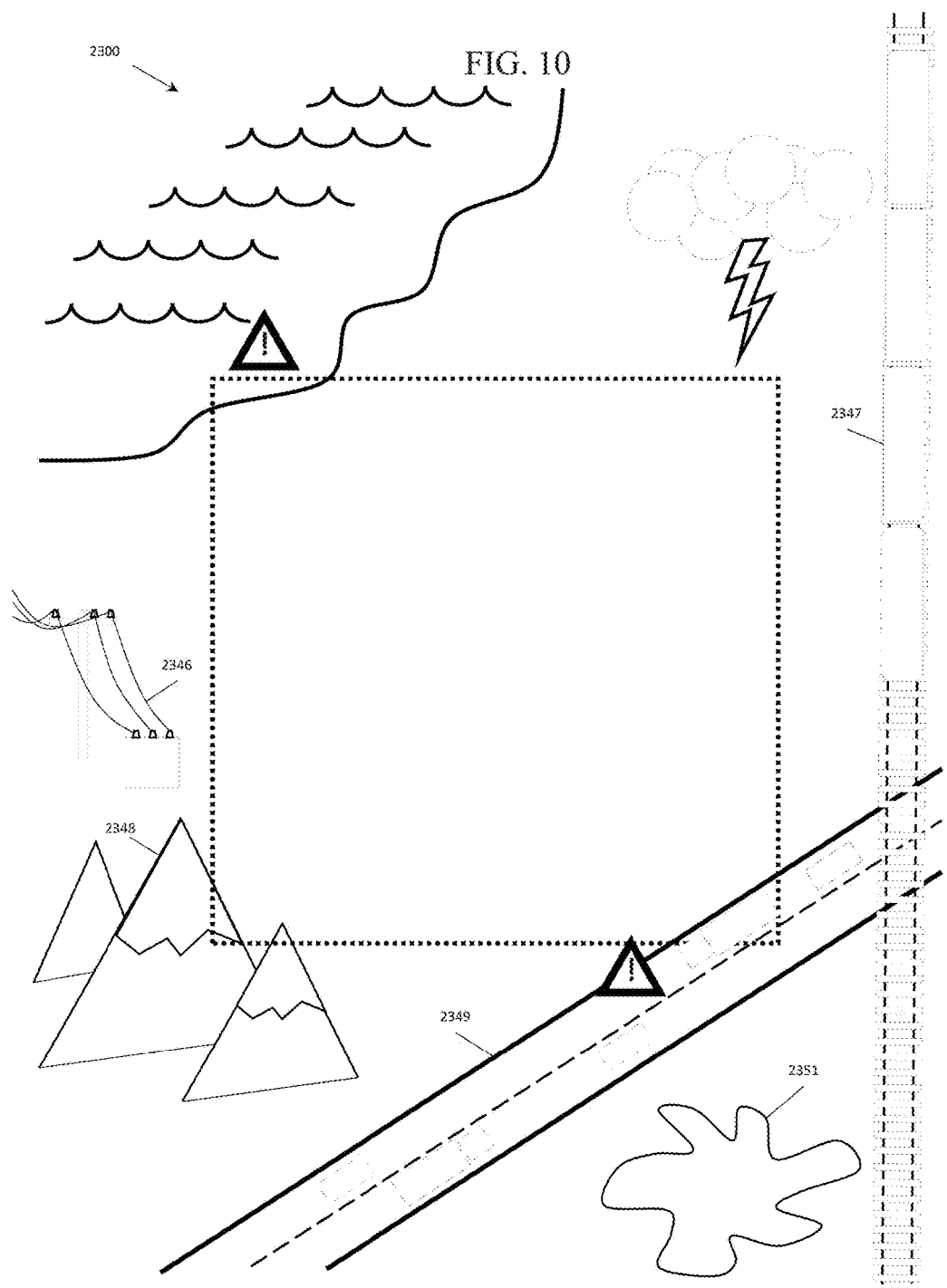

FIG. 10 shows the same "nearby" portion of the Safety SmartSpace seen in FIG. 9. However, also shown are additional hazards and potential hazards, both moving and stationary, outside the Localized Safety Space but in the nearby area. These hazards and potential hazards can include also include moving objects, stationary objects, sources and potential sources of injury, as well as natural features and weather events in the nearby area. Specifically pictured are hazards such as busy highways 2349, rail lines 2347, mountains 2348, high-voltage electrical apparatus 2346, and excavations 2351. As above, other such hazards, not pictured, could also exist and could be monitored at this level.

Figure 11:
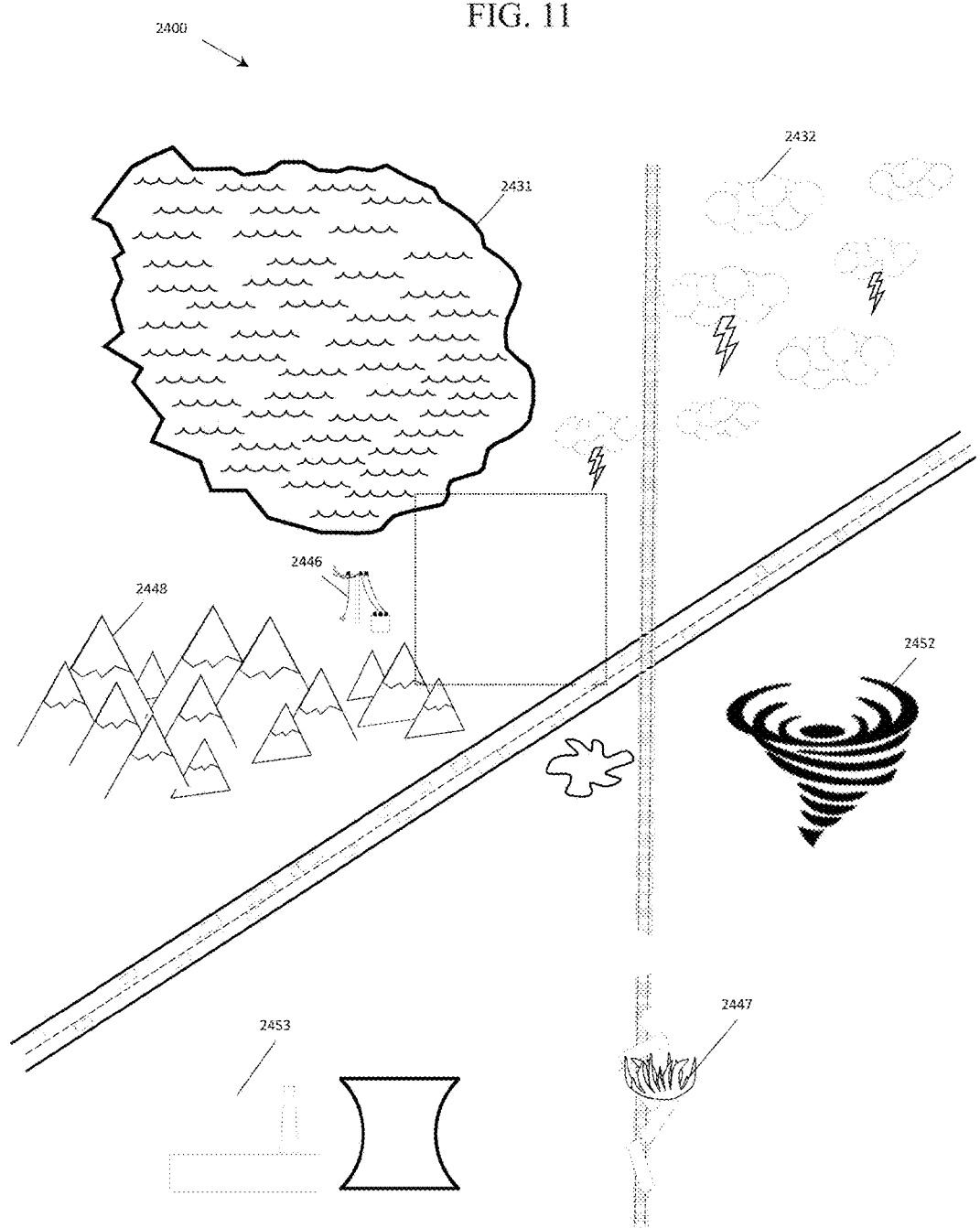

In a similar fashion, FIG. 11 illustrates an embodiment 2400 in which the "regional" portion of the Safety SmartSpace, the nearby portion within it, and the Localized Safety Space inside that. Additional hazards and potential hazards, both moving and stationary, may be present within the regional area. Such hazards could also include moving objects, stationary objects sources of potential injury, natural features and weather events, however primarily of a large scale.

Shown for example are lakes 2431, weather and storm systems 2432, high-voltage transmission lines 2446, rail accidents 2447, mountain ranges 2448, tornados 2452, and nuclear power stations 2453. In at least one embodiment, the hazards are pre-tagged by Infrastructure authorities or Crowdsourcing consensus, by the operator of the equipment or site that is associated with the hazard, or by the Equipment Manufacturer or Facility Management responsible for the hazards that could result from their equipment or facility.

Figure 12:
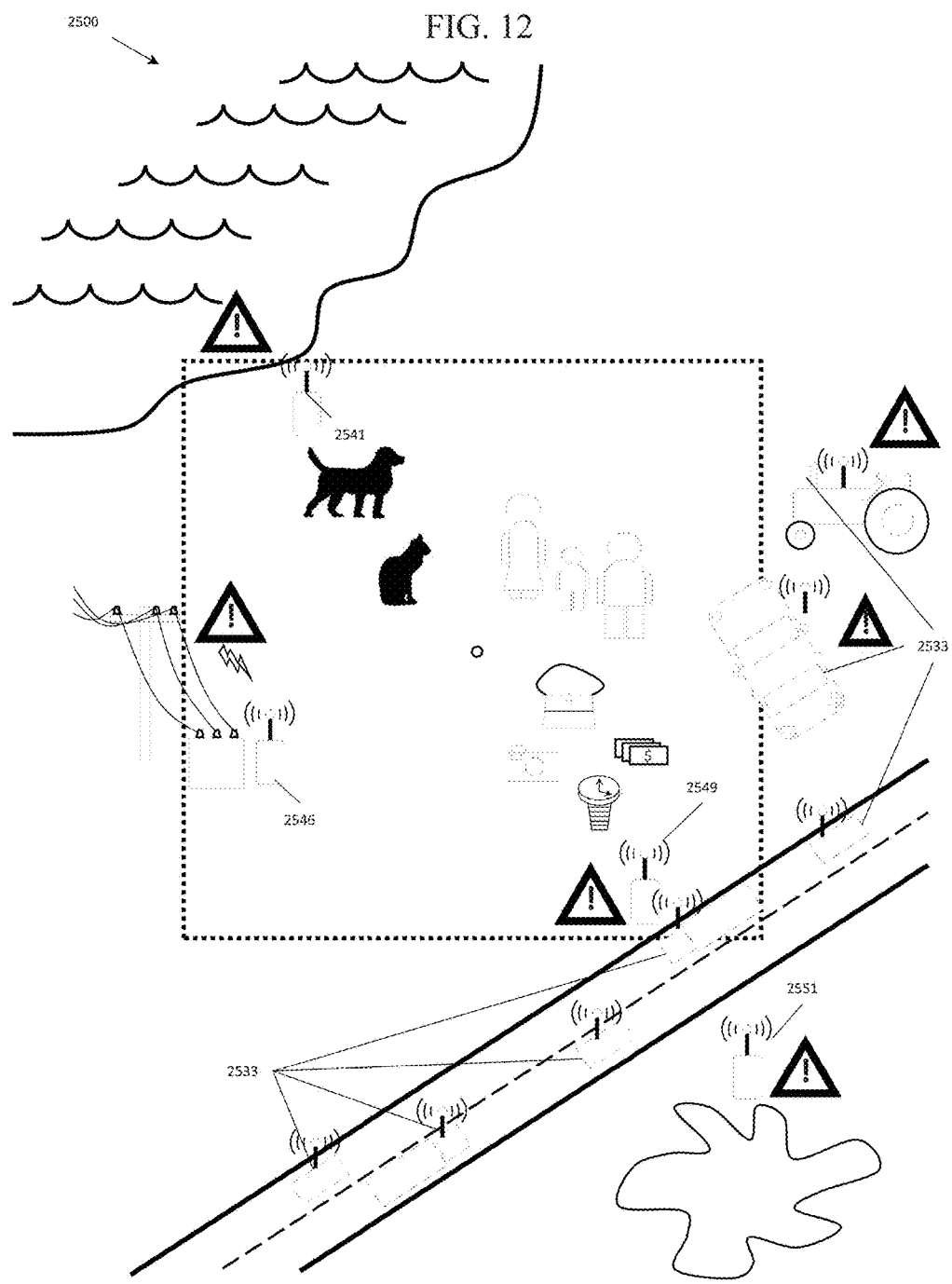

With respect to FIG. 12, another embodiment 2500 illustrates a specific embodiment in which the physical tagging of hazards and potential hazards in the local and nearby portions of the Safety SmartSpace is accomplished using RFID Tags, using on-road and off-road vehicles fitted with Vehicle-to-Vehicle (v2v) and Vehicle-to-Infrastructure (v2i) communications, these using Digital Short-Range Communications (DSRC), and using iBeacons. Specifically pictured are vehicles 2533, these using DSRC and typically considered collision or inadvertent strike hazards but that could also encompass others, and a nearby beach on a lake into which someone could accidentally fall, using an iBeacon 2541. Also pictured are electrical apparatus 2546, a busy highway considered separately from its vehicles 2549, and an open excavation 2551, all using iBeacons. At least one embodiment uses upgraded DSRC localcasts containing Size, Mass, Image, Potential Energy, Kinetic Energy (e.g., m×v), Safety Criticality Level, Tagged (physical, virtual, SmartLabel, or none), GPS Location (with respect to the Safety Perimeter), Microlocation (with respect to the Safety Perimeter), Range, Azimuth, and Rate of Approach.

Figure 13:
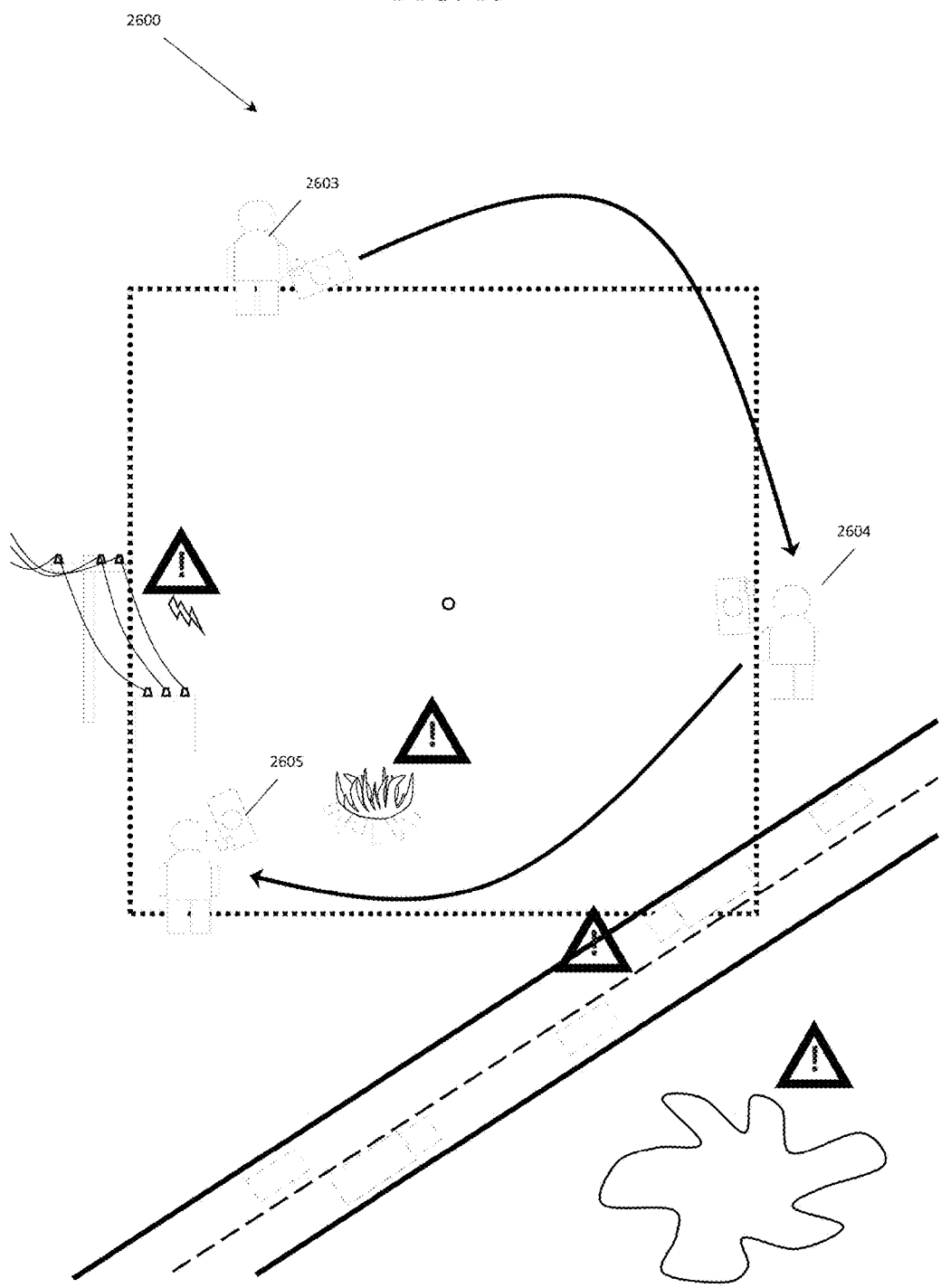

FIG. 13 illustrates a specific embodiment 2600 in which the virtual tagging of hazards and potential hazards in the local and nearby portions of the Safety SmartSpace by constructing a virtual equivalent of these spaces using imaging or video, in the same fashion as the tagging of protected entities. Virtual tags may be created by photographing or taking video of a space being monitored, from each of three positions spread approximately equally around its perimeter, here the locations illustrated 2603, 2604, and 2605. Such an image set or video may be processed in order to identify (tag virtually) each hazard and potential hazard, and to record their initial locations within the Localized Safety Space or nearby area. Subsequent imaging or video, taken continuously or at regular intervals, is used to track the motion or development of the hazards tagged in this way, subsequently displaying a warning and sounding an alarm when any one of them is approaching, or about to cross over, the boundary, thus entering the Localized Safety Space, or when building to critical point if already inside.

Figure 14:
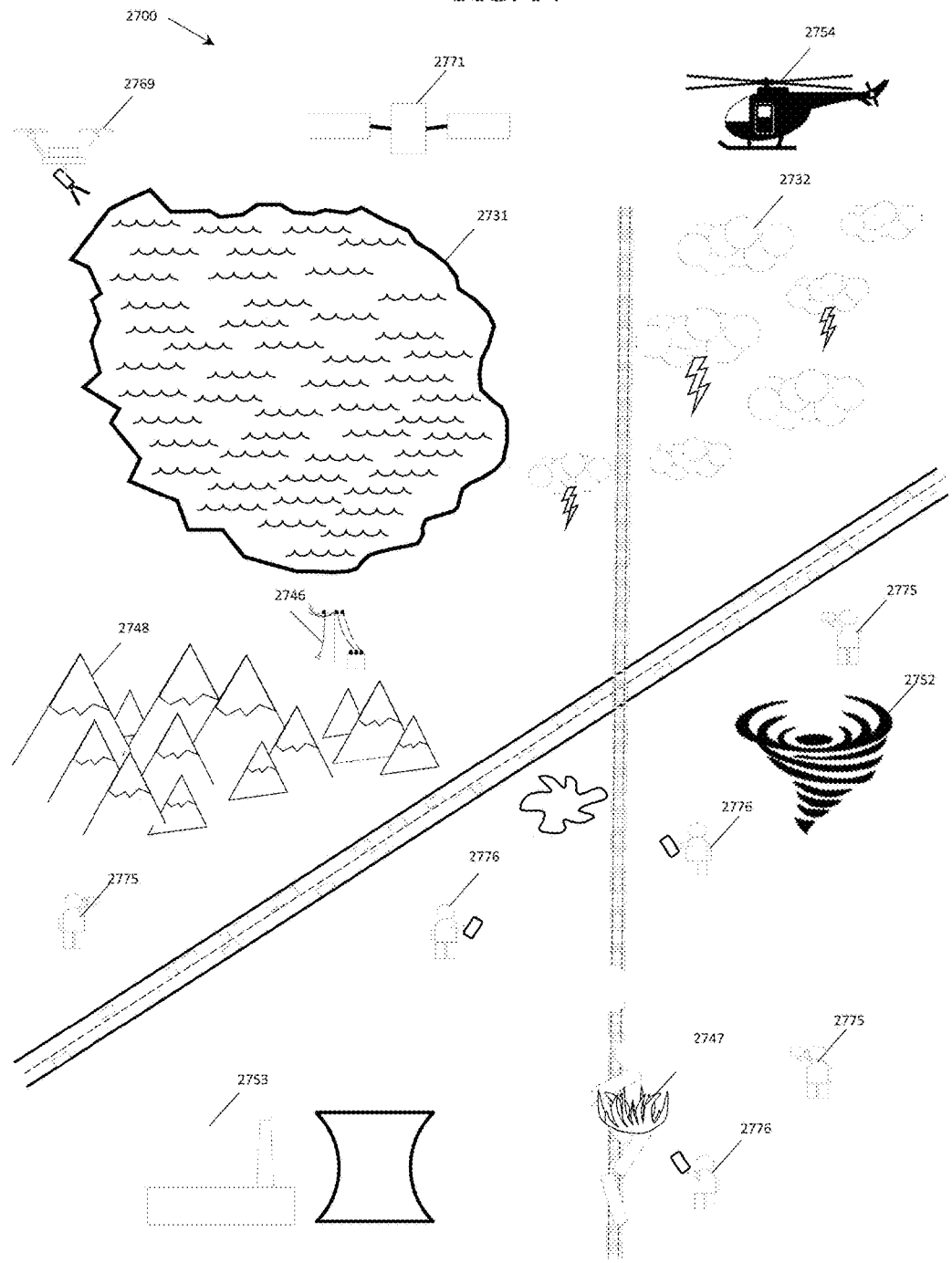
FIGS. 14-18 are schematic illustration of localized safety spaces of different shapes and/or methods of defining a Safety Perimeter.

FIG. 14 pictures a specific embodiment 2700 that applies to the Safety SmartSpace in general in which hazards or potential hazards are detected by spotters, these being people who are generally employed to do so as part of an on-going monitoring effort, as with the National Weather Service, or as part of an information gathering service, such as a news crew. Information about hazards detected in this way is most frequently obtained by direct visual observation by observers on the ground 2775, in aircraft 2754, or using drones with cameras 2769, or satellites 2771 taking photos, and relayed via radio or television, although more recently by internet via services such as Twitter™ or dedicated news service smartphone applications. Also pictured are spotters on the ground and in the air, as well as regional hazards they are likely to detect and track, such as small craft warnings on a lake 2731, storm systems approaching or passing through 2732 including tornados 2752, downed power lines 2746, rail or hazmat accidents 2747, conditions that could lead to an avalanche in mountainous terrain 2748, or emergencies at nuclear power plants 2753.

Also pictured in FIG. 14 are example non-professionals who may come upon a hazard and seek to inform others about it to avoid the occurrence of unintended harm 2776. They are part of a very specific embodiment in which such people contribute their observations via crowdsourcing as described in the text associated with FIG. 1, i.e., via sources of hazard information compiled from multiple people dispersed randomly across a geographic area and each reporting hazard details, detecting, locating, characterizing and tracking the same event or hazard each from a different physical vantage point. Such contributions are to be executed typically via smartphones, electronics tablets, personal computers or other equivalent mechanisms.

Figure 15:
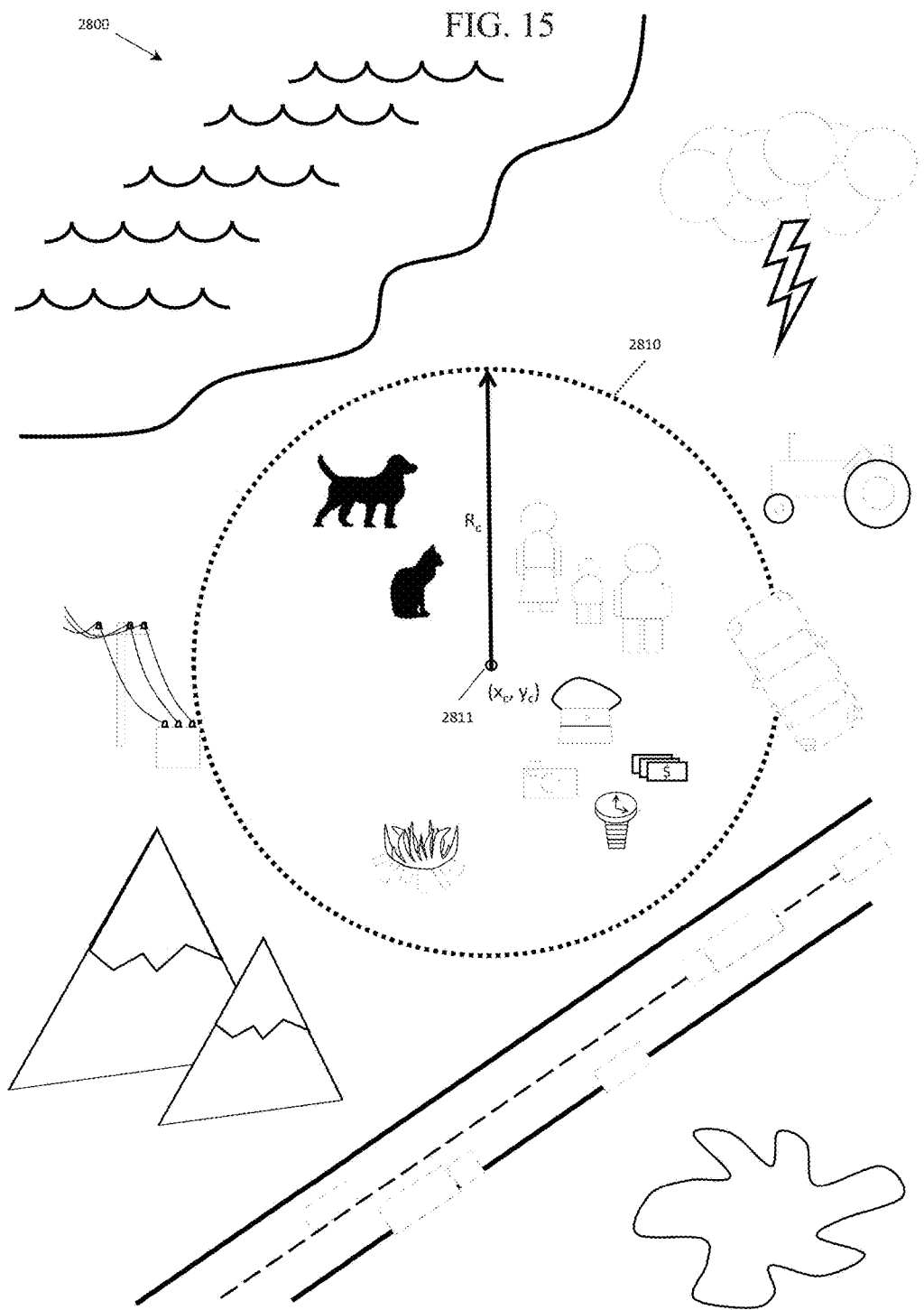

FIG. 15 presents an embodiment 2800 in an alternative geometry 2810 for the boundary of the Localized Safety Space is depicted, i.e., that of a circle circumscribed about a center reference point 2811 of coordinates ($x_C$, $y_C$) and having a defined radius ($R_C$).

Figure 16:
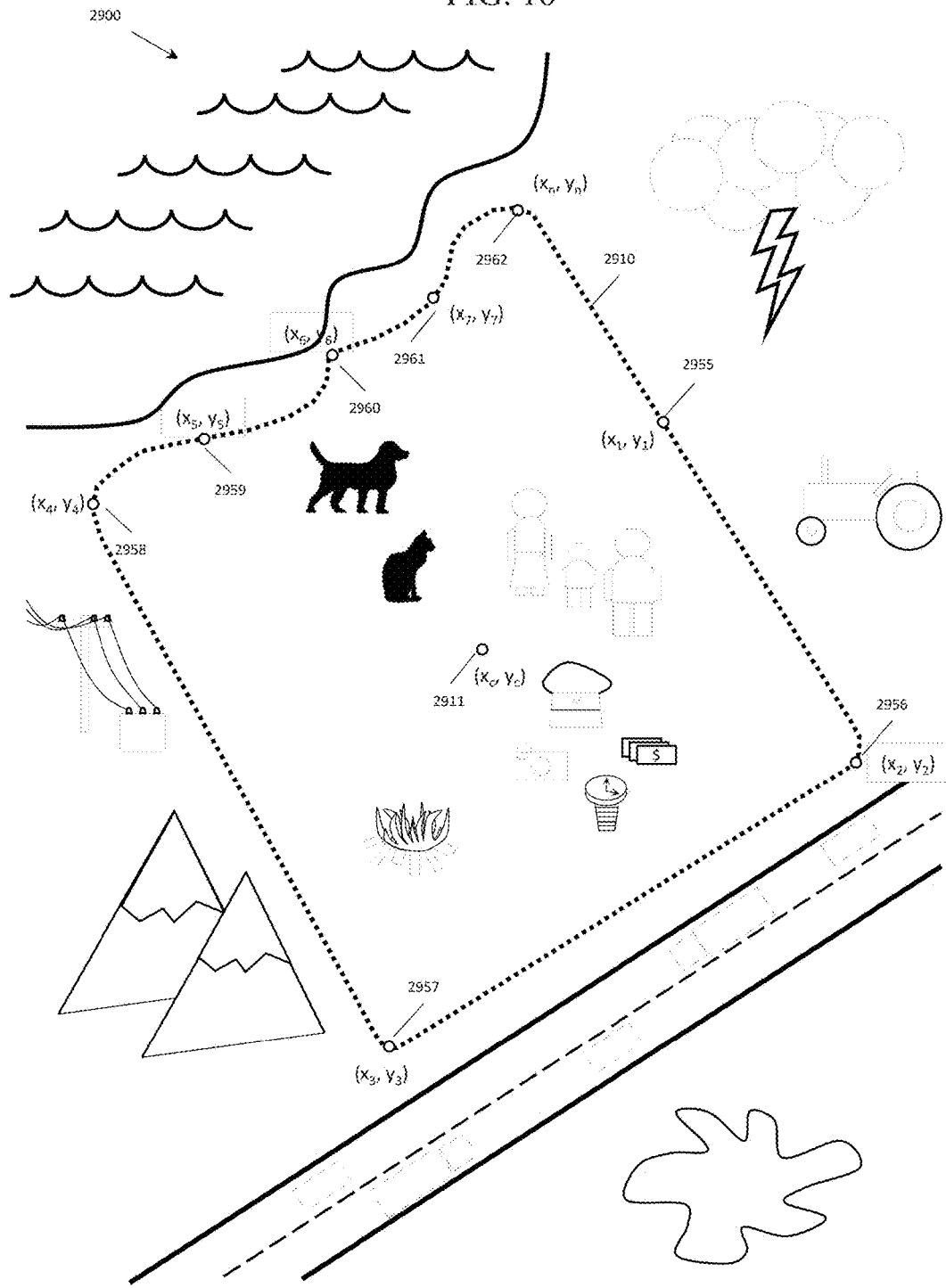

FIG. 16 illustrates another embodiment 2900 in which another alternative geometry 2910 is captured, this one more complex and potentially more useful because it follows allows an observer to establish a specific boundary that is more flexible, relying on a shape of his or her choice. This geometry, or any user-specific alternative consisting of connected line segments, is defined in this embodiment by a collection of points 2955 through 2962 with corresponding coordinate pairs as shown, e.g., ($x_7$, $y_7$) for points 2961, describing the vertices of the polygon that constitutes the shape. As with all boundary shapes this one has a reference point 2911 of coordinates ($x_C$, $y_C$) located at the approximate center of the shape, its specific location computed from vertices making up the geometry.

Figure 17:
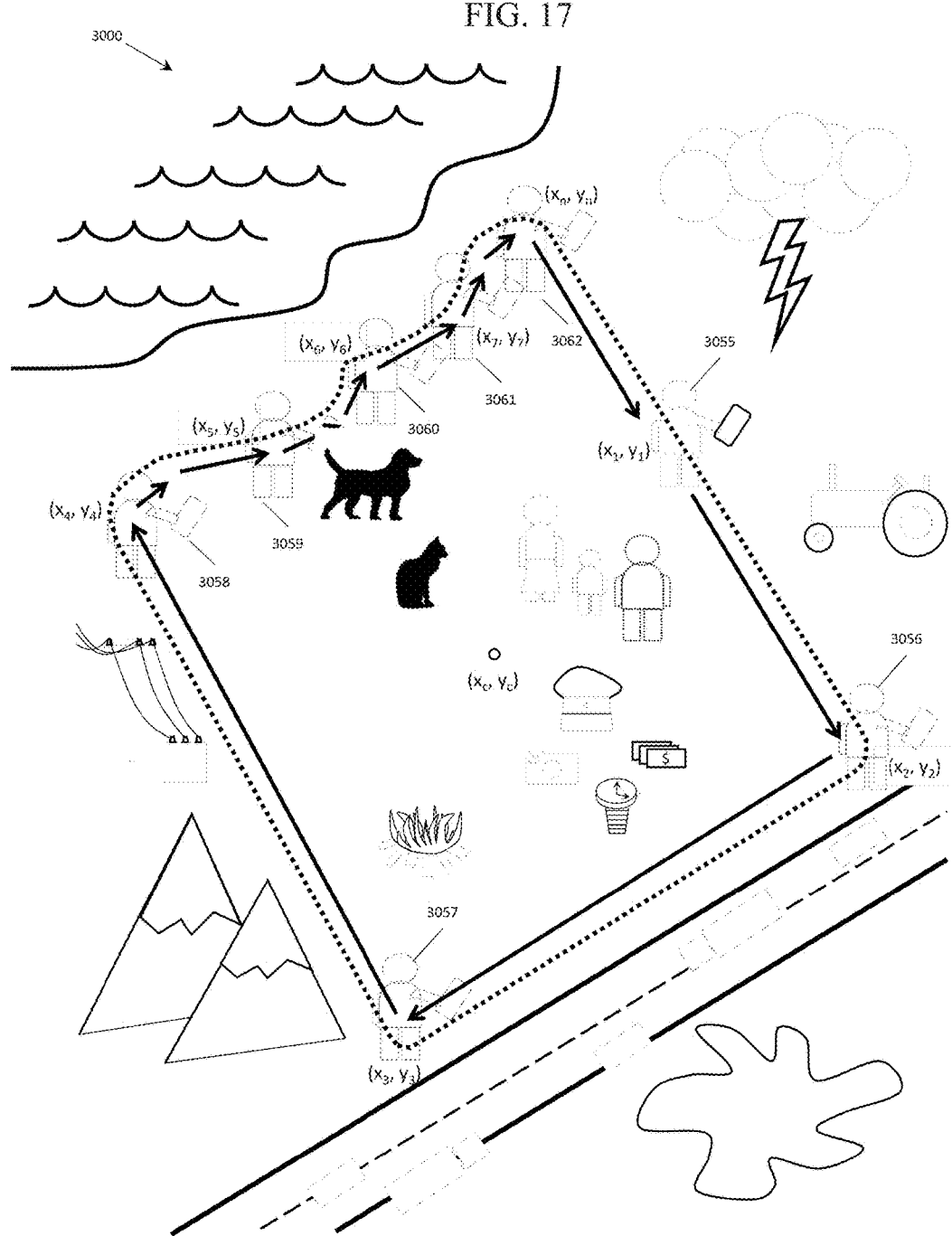

FIG. 17 presents an embodiment 3000 in which an alternative polygonal geometry is based upon line segments and vertices, and specified by walking the perimeter and capturing the vertices as waypoints along the way. Pictured is an observer 3055 carrying a handheld device that is used as a tracking and input mechanism. This observer 3055 may traverse the path that is to be the boundary or safety perimeter, and while walking along the path, logs each vertex 3056 through 3062 using the input mechanism and logic executing on the handheld device. In another embodiment automatic creation of a safety perimeter is achieved by establishing the boundary by querying nearby SmartHazards and monitoring for regional SmartHazards, the precise boundary being laid down around the smallest space that does not contain these hazards.

Figure 18:
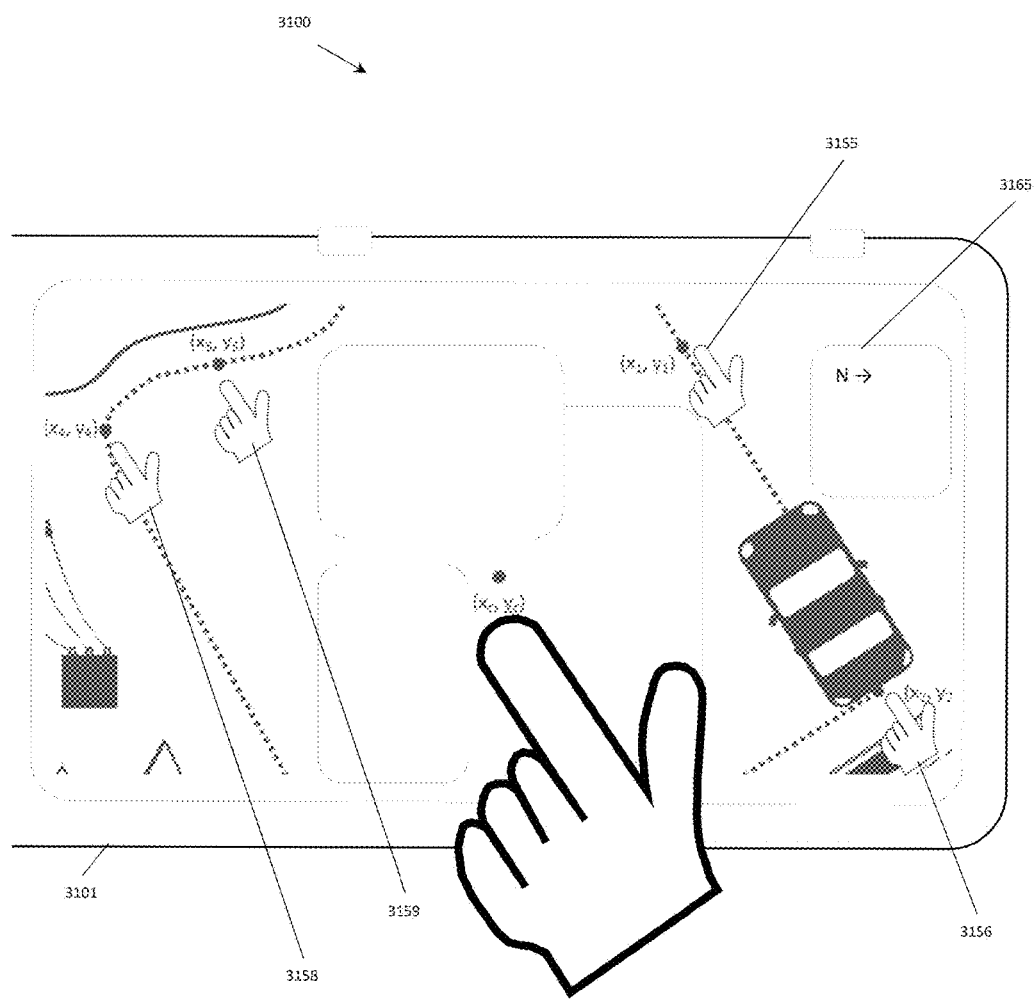

With respect to FIG. 18, this embodiment 3100 depicts entry of vertices captured as waypoints via a handheld device 3101, e.g., by placing vertices on an electronic map pictured on a display 3165. The user simply traverses the path of the perimeter or boundary, not by walking along the path but by placing waypoints, in this case 3155, 3156, 3158, and 3159 (note that not all are pictured but will be entered later by scrolling the map), on an electronic map of the area using the device 3101 and logic executed on the handheld device 3101 and/or via the cloud using the M/C device 101 of FIG. 1.

Figure 19:
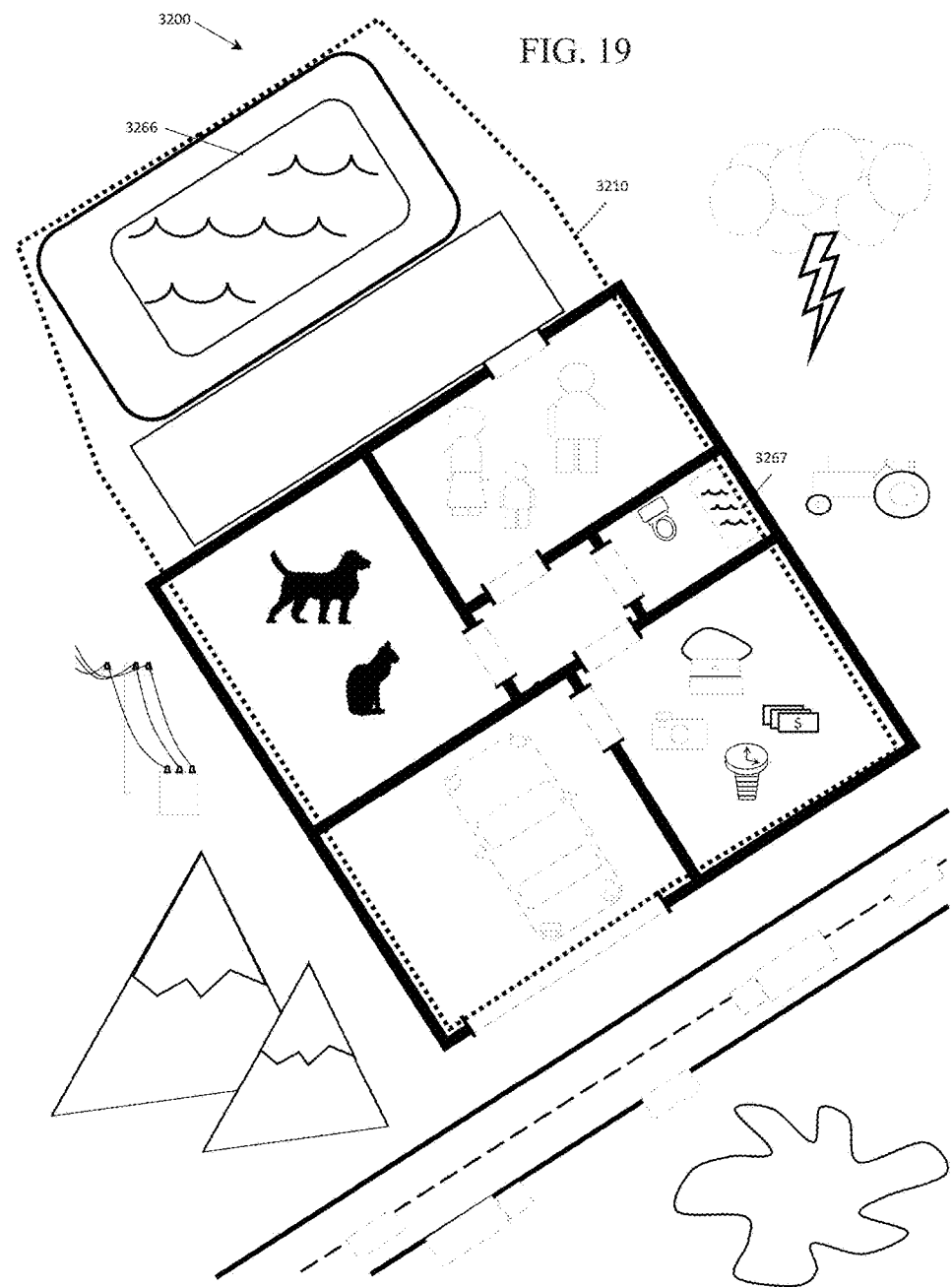
FIGS. 19-22 are schematic depictions of dynamic Safety Perimeters or Safety SmartSpaces.

FIG. 19 presents yet another embodiment 3200 in which an alternative geometry 3210 is used, this one inclusive of indoor and outdoor areas simultaneously and highlighting that the Localized Safety Space can protect indoor spaces as well as those outside of structures. The unique sorts of hazards found indoors can be detected, characterized, classified, monitored and tracked in the same way as those found outside and described in the previous Figures and associated text. Two examples are pictured as an outdoor swimming pool 3266 located within the boundary 3210, and a bathtub that is not empty and is located within the structure 3267. Numerous other types of indoor hazards can also be tracked with the mechanisms described thus far.

Figure 20:
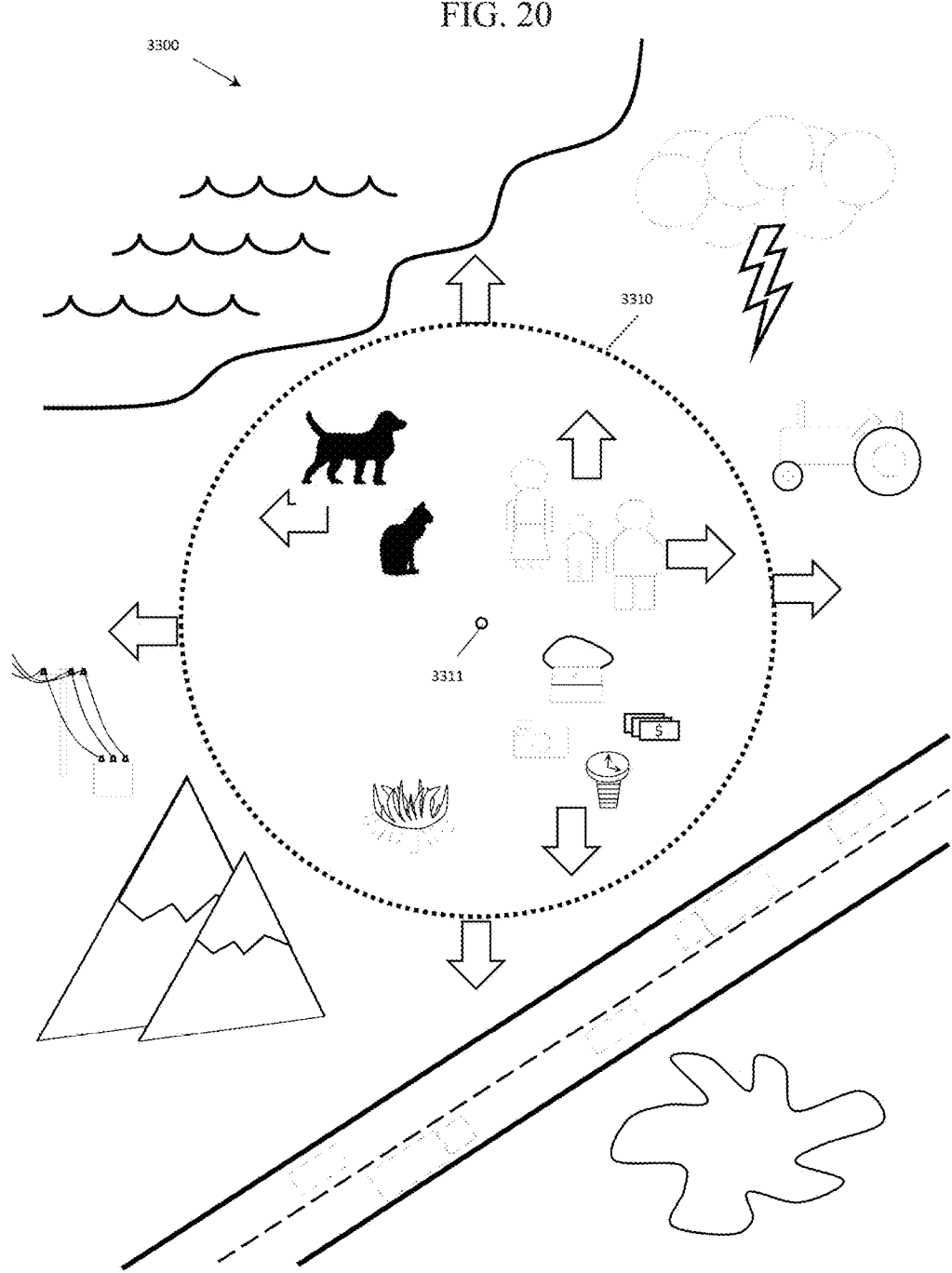

With respect to FIG. 20, a safety perimeter 3310 is shown in another embodiment 3300 that is not fixed in place, but rather moves along with the protected entity. This allows an observer to track the protected entity, for example while hiking or on a trip to the park. All hazard monitoring functionality described thus far applies in this situation. The most important of these may be the monitoring of individuals within the group so that a warning is issued if they are about to become separated from the group as it moves along. Like the fixed-in-place version of this perimeter, this boundary has a center reference point 3311. Movement of this point is used together with the coordinates of all vertices in the boundary to orient the geometry of the boundary as it follows along. In at least one embodiment an Automated Hazard Warning is issued by a hazard to the Localized Safety Monitor in charge of the Safety Perimeter that is approaching it. In several embodiments these kinds of warnings also include local warnings transmitted by dedicated devices at the site of the hazard and narrowcast in the presence of, or upon the appearance or approach of, a nearby safety perimeter.

Figure 21:
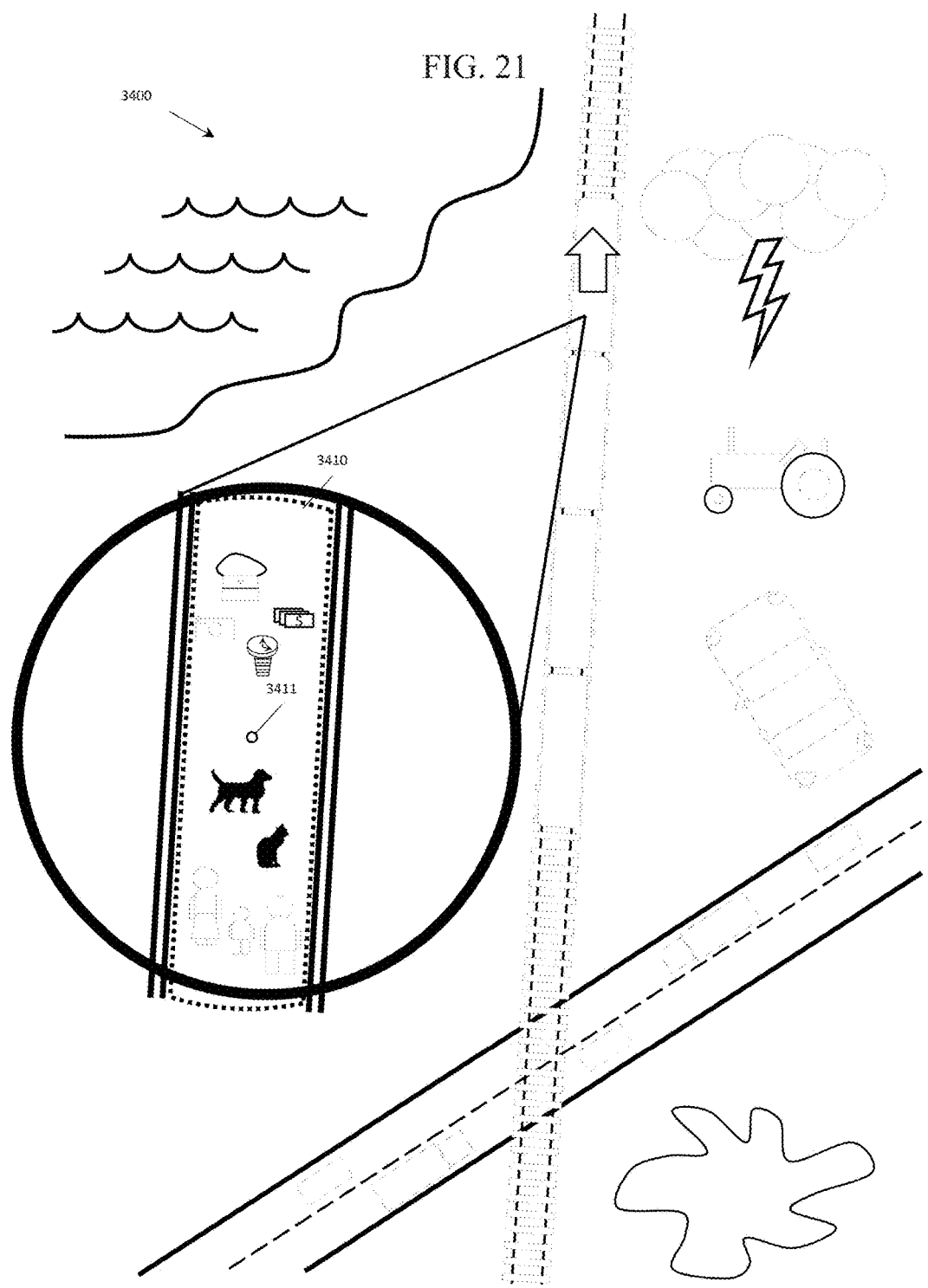

FIG. 21 illustrates an embodiment 3400 in which a Safety Perimeter centered on point 3411 is established inside a moving vehicle 3410 that encompasses an area within the vehicle and moves along with the protected entity inside the vehicle as they travel in the vehicle. Any sort of vehicle is anticipated to be suitable for this embodiment, including but not limited to automobiles, trucks, buses and motor coaches, vessels, trains and aircraft.

Figure 22:
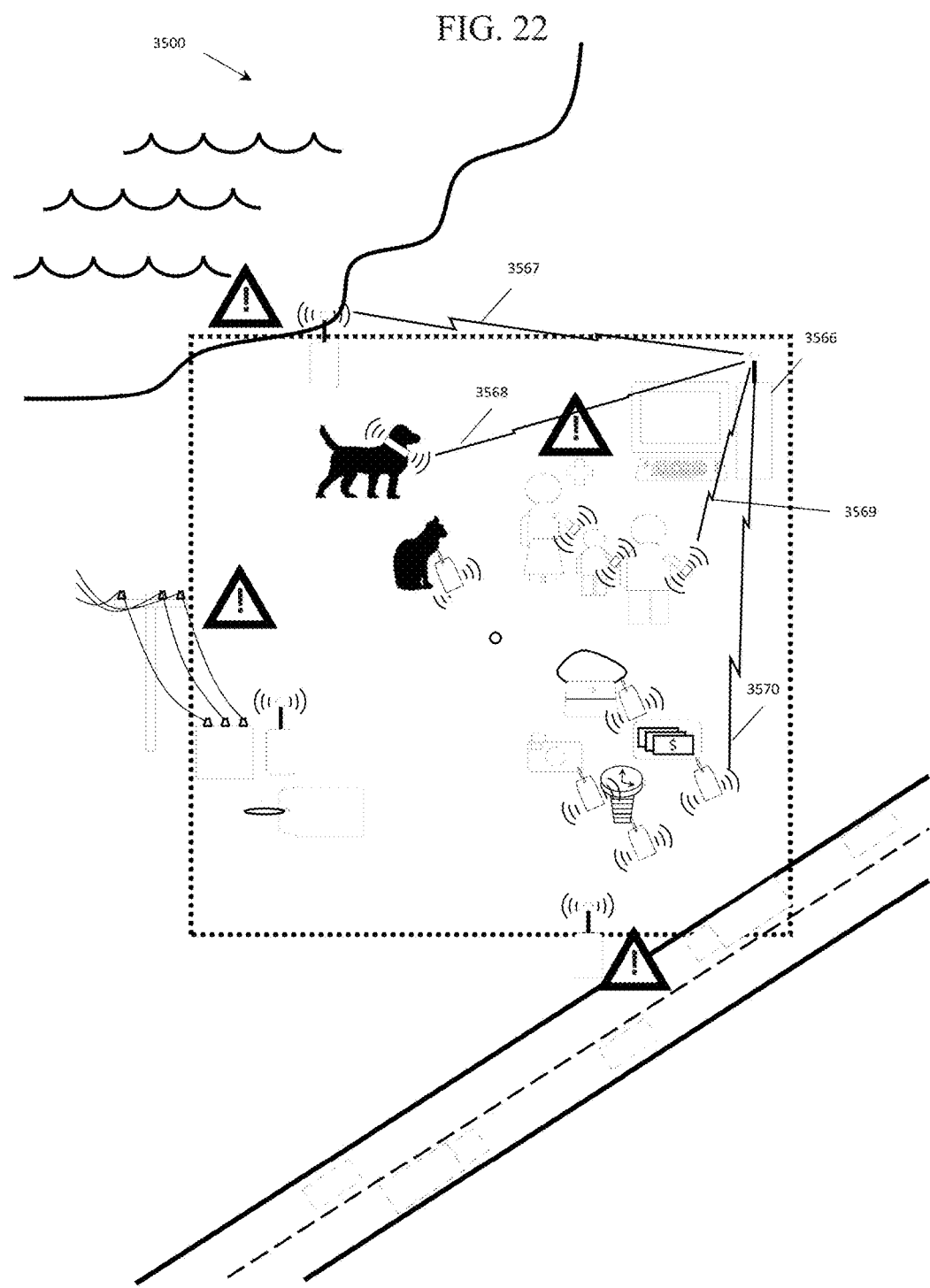

FIG. 22 illustrates another embodiment 3500 in which data communication, and detection, characterization, classification, monitoring and tracking of the protected entity, and hazards and potential hazards, is accomplished using logic running on a personal computer 3566. The computer communicates wirelessly with iBeacons 3567, with smart tags 3568, with wearables 3569, and with RFID tags 3570 in the process of executing its monitoring and control functionality, receiving information from these data sources and communicating hazard warnings to those smart devices among them capable of relaying the warnings to the wearers.

Figure 23:
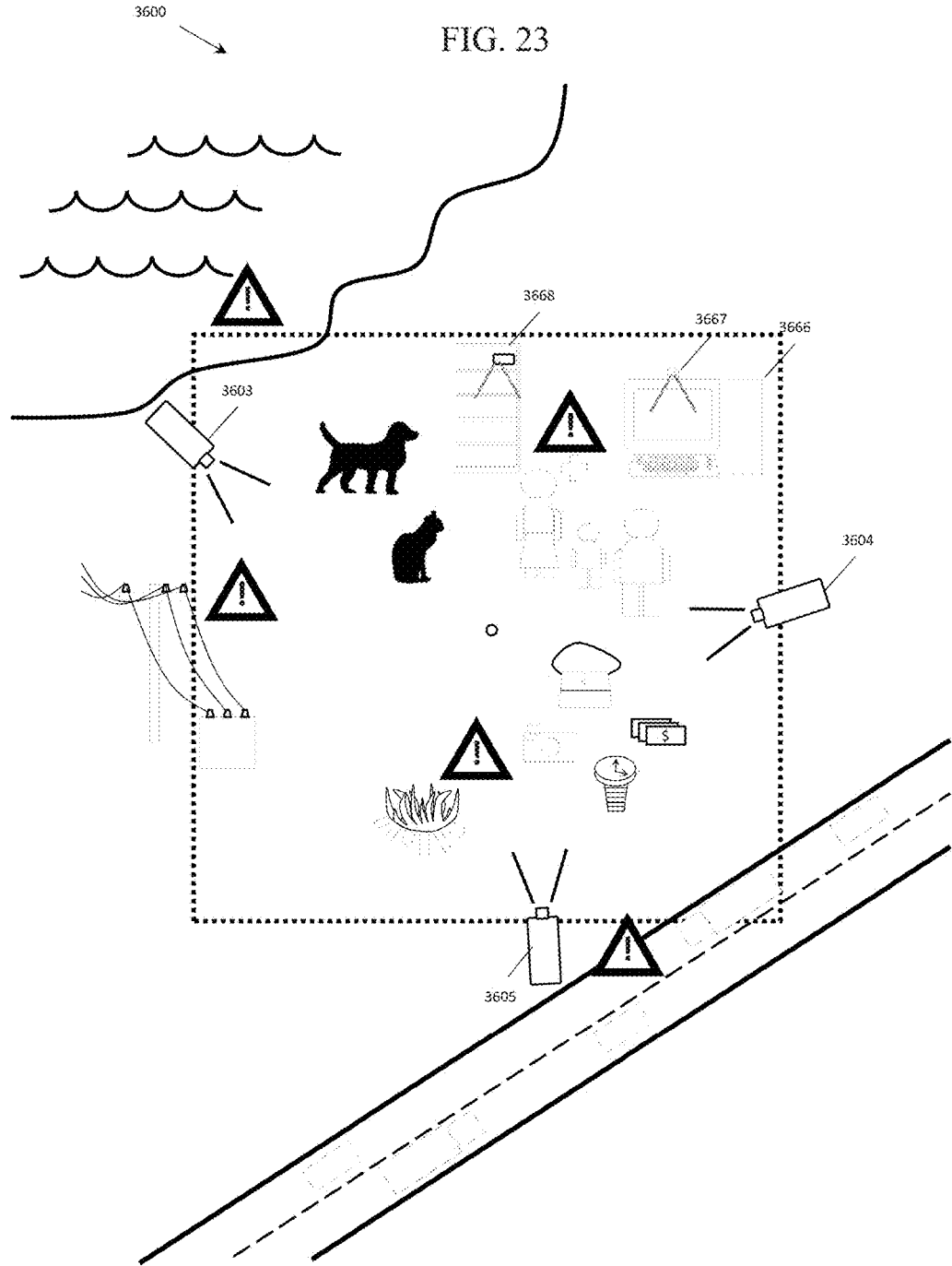
FIGS. 23 and 24 depict example embodiments in which an imaging technique is used to characterize the Safety SmartSpace, the protected entity, and/or the hazard.

FIG. 23 presents an embodiment 3600 extended to the monitoring and tracking of protected entities along with hazards and potential hazards in the local portion of the Safety SmartSpace. Pictured are several devices that are used to image the area, including dedicated still or video cameras 3603, 3604, and 3605, a webcam connected to personal computer 3666 in the space 3667, and a handheld device used in temporary service, placed upon a high shelf in a bookcase within the space 3668.

Figure 24:
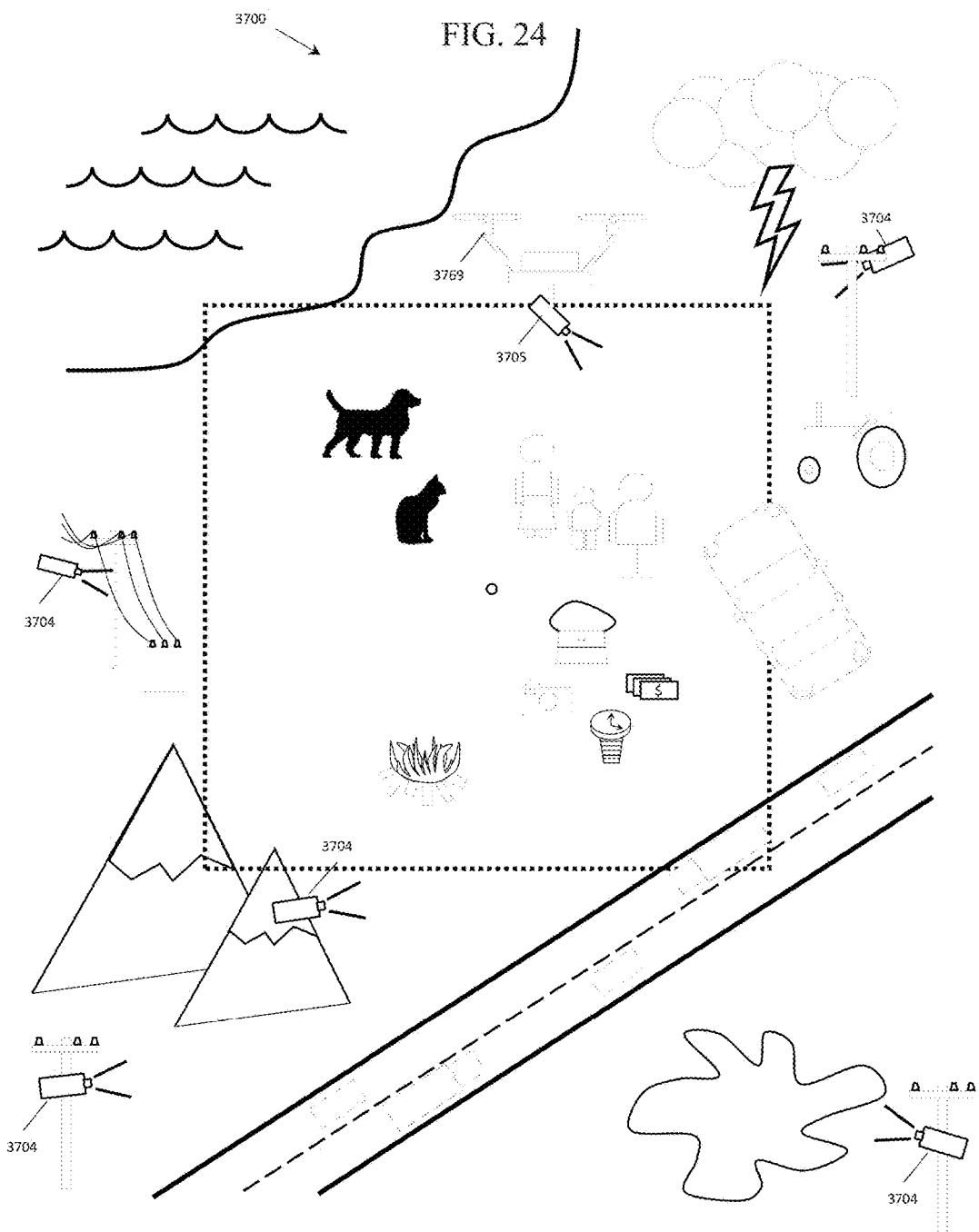

FIG. 24 illustrates an additional embodiment 3700 that extends the imaging technique highlighted to a regional portion of the Safety SmartSpace. Pictured are dedicated still or video cameras 3704 installed around the regional area, and a camera 3705 installed on a drone operating in and above the space 3769. All of these may already be in use for other purposes, perhaps as a means to improve the security of the area via a conventional search by spotters for hazards or security issues.

Figure 25:
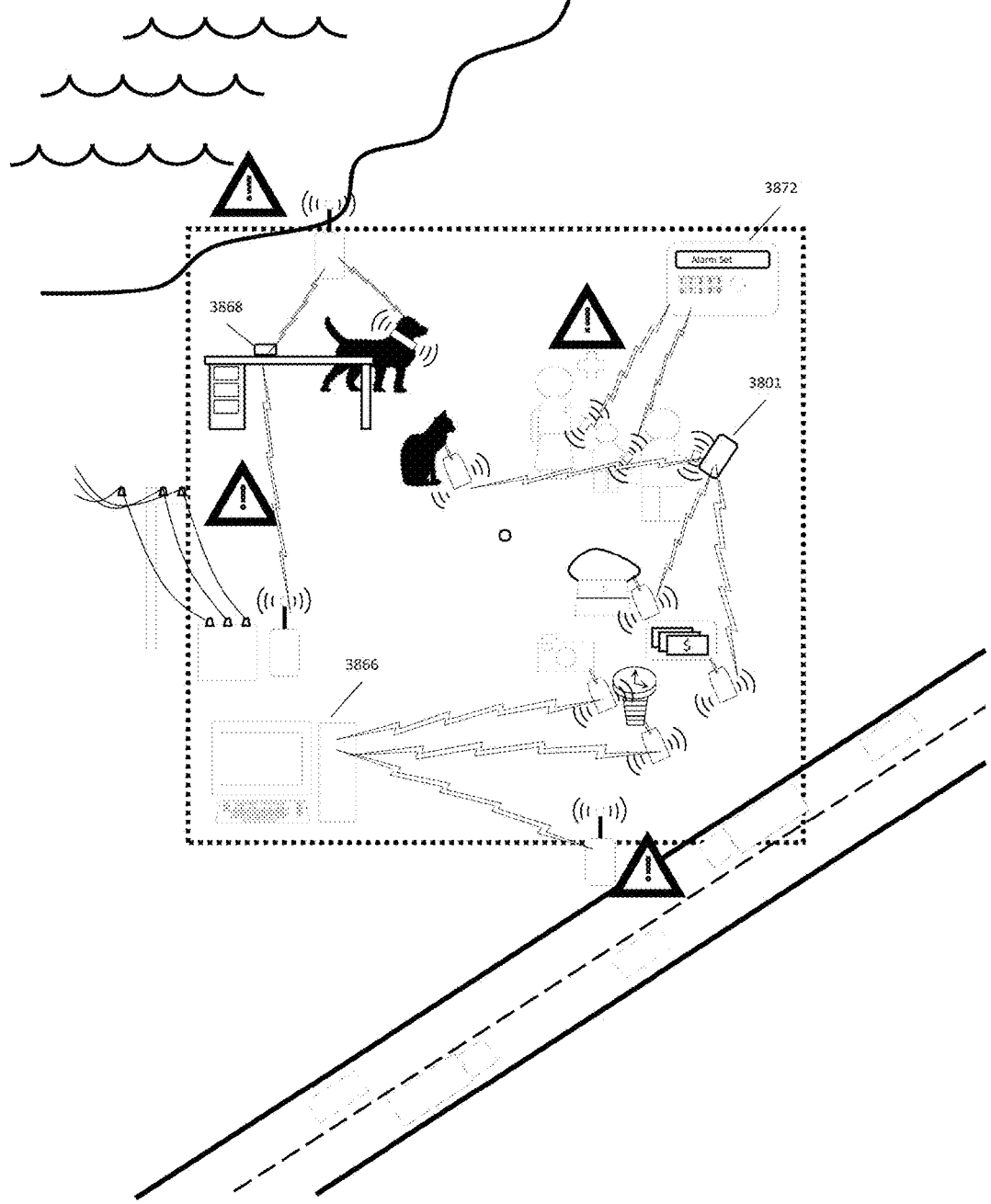
FIG. 25 is an illustration of a cooperative embodiment for monitoring the Safety SmartSpace.

FIG. 25 shows several devices monitor the Localized Safety Space cooperatively, with such cooperation being intended among devices in the Safety SmartSpace via the distributed system which executes and controls it. Pictured are several devices that cooperate collectively within this embodiment to accomplish the functionality of the Local Safety Space Monitor instead of it being present on only one. These include a personal computer 3866, a handheld device 3801 in the hand of a user, a handheld device 3868 placed on a table, and a dedicated electronic security system 3872, each of which is communicating with a unique subset of the total set of devices employed, and with each other in support of the greater functionality of the Local Safety Space Monitor.

Figure 26:
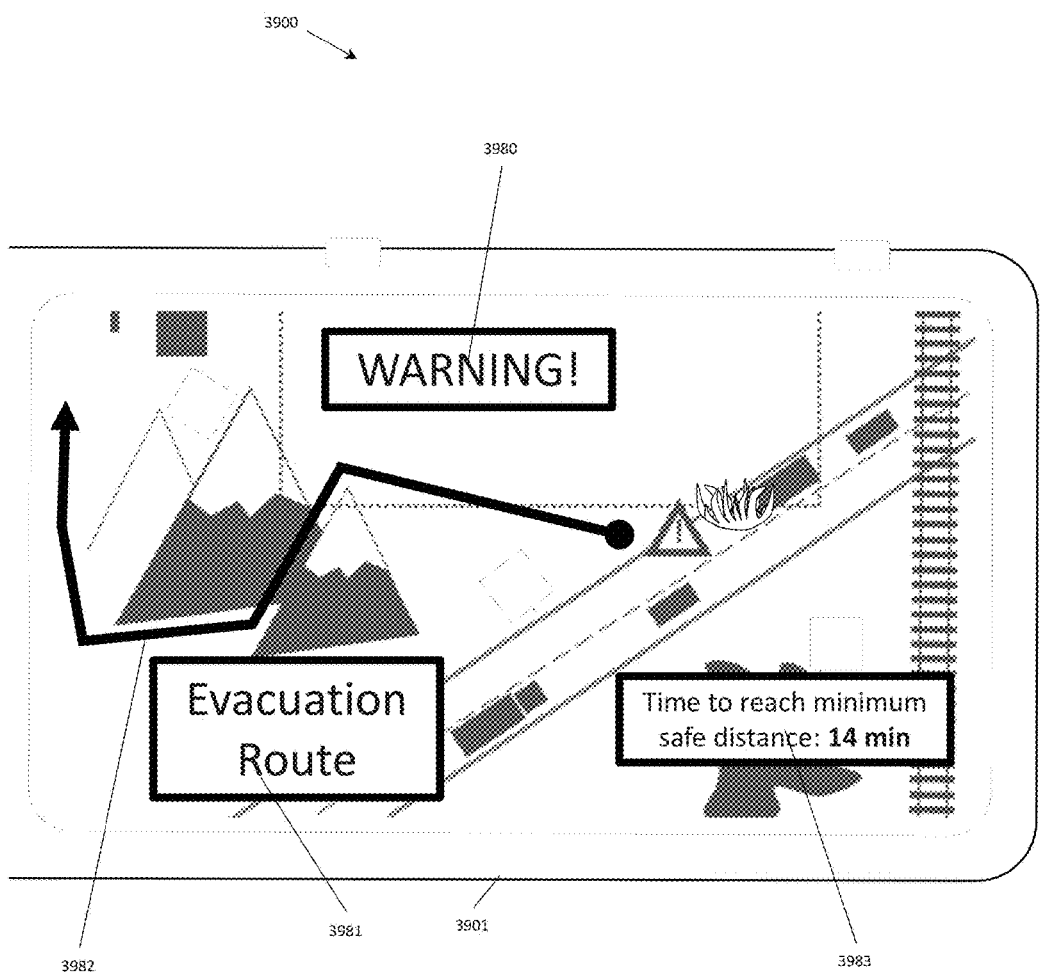
FIG. 26 is an embodiment in which a warning is presented via a handheld device.

FIG. 26 illustrates an embodiment 3900 in which a warning is presented via the display on a handheld device 3901, delivering a warning 3980 that is supplemented with a detailed electronic map showing the present location of protected entities, and annotated graphically with directions 3981 for evacuating them to a safer location as a means of mitigating the hazard 3982, as well as presenting a detailed summary report on the amount of time 3983 available to do so. This warning may also be delivered in the form of an audible alarm, or said alarm together with a verbal announcement of the same information.

Figure 27:
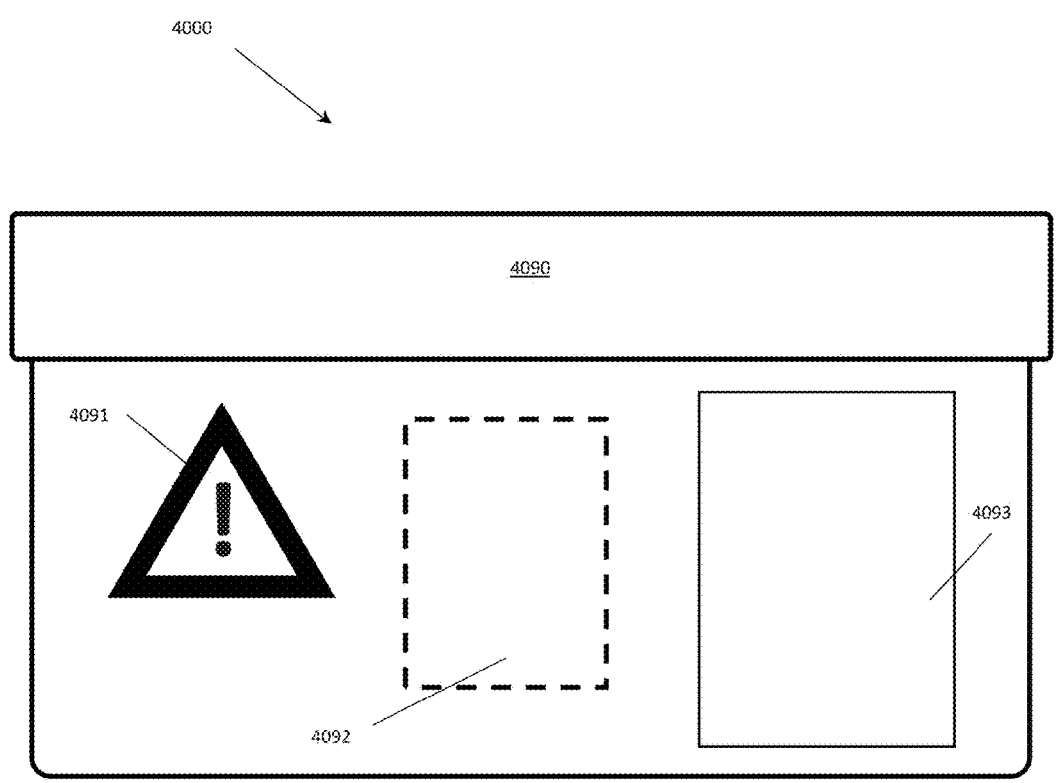
FIGS. 27 and 28 depict different embodiments and uses for smart containers as set forth herein.

FIG. 27 depicts a safety smart container 4000 in which a generic container 4090 is fitted with a large scale image of the international symbol for warning 4091. Container 4090 also displays a unique form of visual code 4093, not unlike a bar or QR code, but readable optically at a distance of 1-50 meters, with the code 4093 capturing detail identifying the type and nature of the hazard or entity. This specialized container informs the Safety SmartSpace of its presence when detected via imaging, optical, thermal, or by other means, or via the RF tagging functionality within the Smart-Tag. The container 4090 is also fitted with an electronic identification and control module 4092, which in this embodiment serves two purposes: functioning as a specialized Smart Tag, dedicated to the container; in another, featuring a touchscreen; and serving as the Localized Safety Space Monitor in itself. This specialized container informs the Safety SmartSpace of its presence and contents when detected via imaging or via the RF tagging functionality within the SmartTag.

Figure 28:
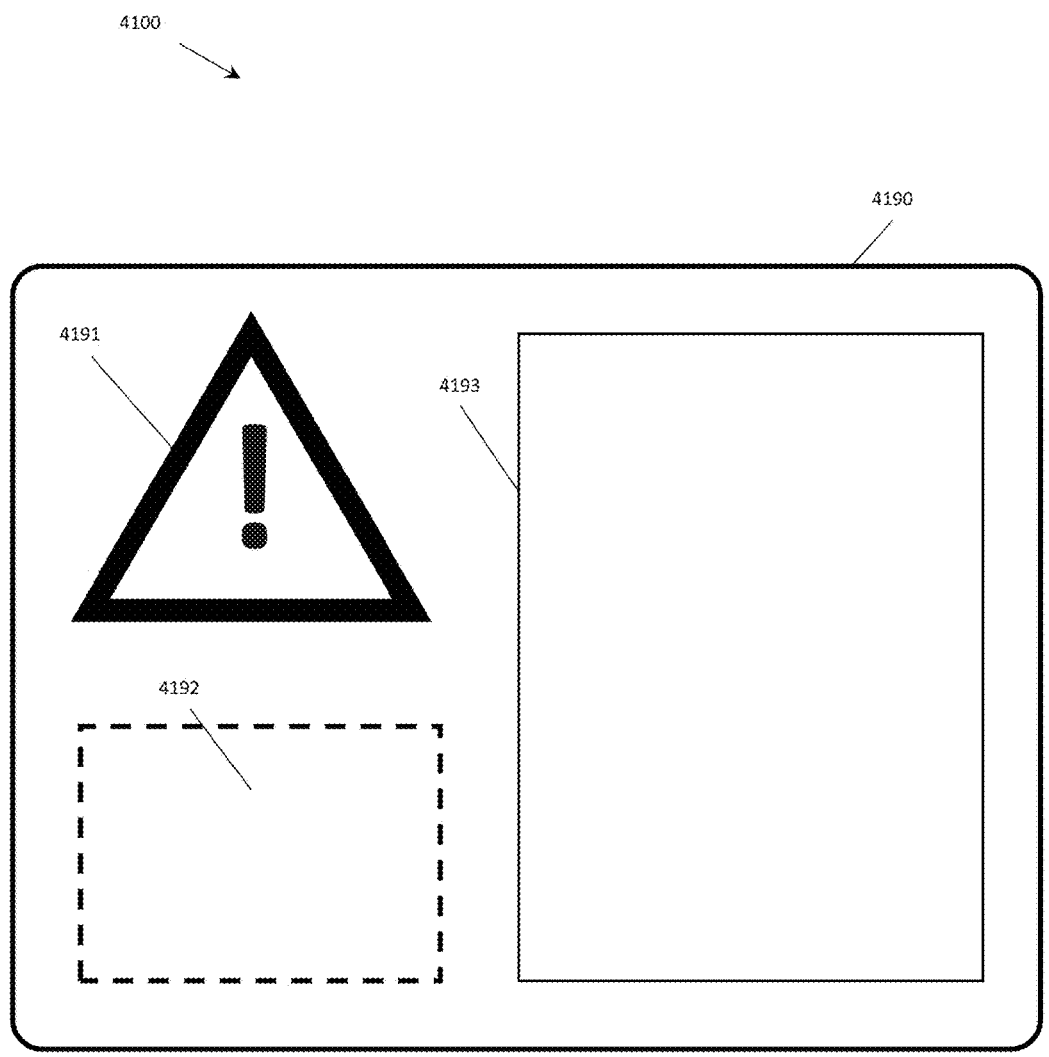

FIG. 28 presents a Safety SmartLabel and describes one embodiment in which an adhesive label 4190, being affixed to any container, converting the common container into a safety smart container. The label is also fitted in a fashion similar to the safety smart container with a bar code 4193 and an electronic identification and control module 4192, which in this embodiment serves the purpose of executing the functionality of a Smart Tag dedicated to the label. The Safety SmartSpace is thus informed of the presence and contents of the smart container when detected via imaging or via RF with Smart Tag functionality.

While the best modes for carrying out the present disclosure have been described in detail, those familiar with the art to which this invention relates will recognize various alternative designs and embodiments within the scope of the appended claims.

The invention claimed is:

1. A method of securing a protected entity from a hazard, the method comprising:
   defining a designated first area, via a monitoring and control (M/C) device;
   defining a designated second area within the first area via the M/C device, wherein the second area surrounds the protected entity, wherein the designated first and second areas are geographic zones or areas monitored by a plurality of monitoring systems in communication with the M/C device;
   selecting the hazard from among a predetermined list of potential hazards using the M/C device;
   determining geographic coordinates of the protected entity using a local positioning device;
   detecting a proximity of the hazard to the first area via the M/C device using a plurality of input signals from the monitoring systems;
   determining a numeric criticality score for the detected hazard using a characteristic of the hazard and a characteristic of the protected entity; and
   executing a localized control action with respect to the protected entity, via the M/C device, when the numeric criticality score exceeds a calibrated threshold, wherein the localized control action includes generating and transmitting an alert signal to thereby activate a warning device.

2. The method of claim 1, further comprising physically tagging the protected entity with the local positioning device.

3. The method of claim 1, wherein defining the designated second area includes selecting a predefined shape from a menu of geometric shapes.

4. The method of claim 1, wherein defining the designated second area includes recording waypoints as a series of two-dimensional or three-dimensional coordinates.

5. The method of claim 1, wherein the hazard is a fixed or stationary hazard, and wherein detecting proximity of the hazard includes receiving information from an electronic beacon positioned with respect to the fixed or stationary hazard.

6. The method of claim 1, wherein detecting proximity of the hazard includes receiving images from a plurality of cameras, extracting geographical coordinates from metadata of the images via the M/C device, and comparing the extracted geographical coordinates to geographic coordinates of the defined second area.

7. The method of claim 1, wherein the protected entity is a person, and wherein the characteristic of the protected entity includes a physical quality of the person.

8. The method of claim 7, wherein the physical quality is an age of the person.

9. The method of claim 7, wherein the physical quality is a mental or physical capability of the person.

10. The method of claim 1, wherein the protected entity is an animal wearing an electronic pet collar as a local positioning device, and wherein the localized control action includes transmitting an audible message to the collar as the alert signal.

11. The method of claim 1, further comprising recording a location of a safe state in memory of the M/C device, wherein the safe state is a physical location providing shelter or protection from the identified hazard, and wherein executing a localized control action includes prompting the protected entity, via a portable device, with directions to the safe state.

12. The method of claim 1, wherein at least one of the hazard and the protected entity is mobile, and wherein detecting proximity of the hazard includes tracking a trajectory of the hazard with respect to the protected entity or vice versa.

13. A system comprising:
a monitoring and control (M/C) device in communication with a plurality of monitoring systems and programmed to secure a protected entity from a hazard with a designated second area within a designated first area, and including memory and a processor; and
a local positioning device in communication with the M/C device and collocated with the protected entity;
wherein the memory of the M/C device is programmed with instructions that, when executed by the processor, cause the M/C device to:
define the designated first and second areas as geographic zones or areas monitored by the monitoring systems, wherein the designated second area is within the designated first area;
receive a selected hazard from a predetermined list of potential hazards;
receive geographic coordinates of the protected entity from the local positioning device;
detect a proximity of the hazard to the designated second area using input signals from the monitoring systems;
determine a numeric criticality score for the detected hazard using a characteristic of the hazard and a characteristic of the protected entity; and
execute a localized control action with respect to the protected entity when the numeric criticality score exceeds a calibrated threshold, wherein the localized control action includes generating and transmitting an alert signal to a warning device.

14. The system of claim 13, wherein the M/C device is programmed to define the designated second area by receiving a selected predefined shape for the designated second area from a menu of geometric shapes.

15. The system of claim 13, wherein the M/C device is programmed to define the designated second area by recording way points as a series of two-dimensional or three-dimensional coordinates.

16. The system of claim 13, wherein at least one of the hazard and the protected entity is mobile, and wherein the M/C device is programmed to detect the proximity of the hazard by tracking a trajectory of the hazard with respect to the protected entity or vice versa.

17. The system of claim 13, wherein the M/C device is programmed to detect the proximity of the hazard by receiving images from a plurality of cameras, extracting geographical coordinates from metadata of the images, and comparing the extracted geographical coordinates to geographic coordinates of the designated second area.

18. The system of claim 13, wherein the protected entity is a person, and wherein the characteristic of the protected entity includes a physical quality of the person.

19. The system of claim 13, wherein the protected entity is an animal wearing an electronic pet collar as the local positioning device, and wherein the localized control action includes transmitting an audible message to the collar as the alert signal.

20. The system of claim 13, wherein the M/C device is further programmed to record a location of a safe state in the memory as a physical location providing shelter or protection from the identified hazard, and to execute the localized control action by prompting the protected entity, via a warning device, with directions to the safe state.

* * * * *